United States Patent
Shaheen

(10) Patent No.: US 10,419,964 B2
(45) Date of Patent: *Sep. 17, 2019

(54) METHOD AND APPARATUS FOR MACHINE-TO-MACHINE COMMUNICATION REGISTRATION

(71) Applicant: InterDigital Patent Holdings, Inc., Wilmington, DE (US)

(72) Inventor: Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 89 days.

This patent is subject to a terminal disclaimer.

(21) Appl. No.: 14/291,844

(22) Filed: May 30, 2014

(65) Prior Publication Data
US 2014/0269283 A1 Sep. 18, 2014

Related U.S. Application Data

(63) Continuation of application No. 12/943,321, filed on Nov. 10, 2010, now Pat. No. 8,750,145.
(Continued)

(51) Int. Cl.
*H04L 12/28* (2006.01)
*H04W 28/02* (2009.01)
(Continued)

(52) U.S. Cl.
CPC ....... *H04W 28/0221* (2013.01); *H04L 63/104* (2013.01); *H04L 67/12* (2013.01);
(Continued)

(58) Field of Classification Search
USPC .... 370/229, 241.1, 252, 254, 311, 312, 313, 370/328, 329, 338, 395.2, 395.21, 395.3,
(Continued)

(56) References Cited

U.S. PATENT DOCUMENTS

| 5,974,312 A | 10/1999 | Hayes, Jr. et al. |
| 6,473,411 B1 | 10/2002 | Kumaki et al. |
| (Continued) | | |

FOREIGN PATENT DOCUMENTS

JP   2004-236070   7/2005

OTHER PUBLICATIONS

European Telecommunications Standards Institute, "Machine-to-Machine communications (M2M); M2M service requirements," ETSI TS 102 689 V0.2.1 (2009).
(Continued)

*Primary Examiner* — Yemane Mesfin
*Assistant Examiner* — Mon Cheri S Davenport
(74) *Attorney, Agent, or Firm* — Volpe and Koenig, P.C.

(57) ABSTRACT

Methods and apparatus are disclosed for Machine to Machine (M2M) communication registration. The methods provide single and periodic registration and may be device or network based. The devices in the system may be divided into groups. A single device member may perform the basic access steps for the group. Other devices may receive related access information on a control channel and use the information to access the system. The devices may send data, get updates, and then go to sleep. Internet addresses may be released or maintained. During a control cycle, the devices may wake up and listen to the control channel for any paging messages. Individual devices or the entire group may access the system. During a reporting cycle, all the devices may wake up and access the system to connect to the M2M system to upload data.

16 Claims, 21 Drawing Sheets

Related U.S. Application Data

(60) Provisional application No. 61/263,980, filed on Nov. 24, 2009, provisional application No. 61/263,758, filed on Nov. 23, 2009, provisional application No. 61/263,578, filed on Nov. 23, 2009, provisional application No. 61/263,724, filed on Nov. 23, 2009.

(51) Int. Cl.
| | | |
|---|---|---|
| *H04L 29/06* | (2006.01) | |
| *H04W 12/08* | (2009.01) | |
| *H04W 60/00* | (2009.01) | |
| *H04L 29/08* | (2006.01) | |
| *H04W 72/00* | (2009.01) | |
| *H04W 72/02* | (2009.01) | |
| *H04W 4/70* | (2018.01) | |
| *H04W 4/08* | (2009.01) | |
| *H04W 8/26* | (2009.01) | |
| *H04W 68/00* | (2009.01) | |

(52) U.S. Cl.
CPC .............. *H04W 4/70* (2018.02); *H04W 12/08* (2013.01); *H04W 60/00* (2013.01); *H04W 72/005* (2013.01); *H04W 72/02* (2013.01); *H04W 4/08* (2013.01); *H04W 8/26* (2013.01); *H04W 68/00* (2013.01)

(58) Field of Classification Search
USPC ...... 370/395.31, 395.32, 400, 401, 431, 437
See application file for complete search history.

(56) References Cited

U.S. PATENT DOCUMENTS

| | | | | |
|---|---|---|---|---|
| 8,750,145 B2* | 6/2014 | Shaheen | ............... | H04L 63/104 370/252 |
| 2004/0185854 A1* | 9/2004 | Artola | .................. | H04W 8/12 455/445 |
| 2005/0222933 A1* | 10/2005 | Wesby | .................. | G06Q 40/00 705/36 R |
| 2006/0187897 A1* | 8/2006 | Dabbs, III | .............. | H04W 4/06 370/349 |
| 2008/0178212 A1* | 7/2008 | Kinoshita | .......... | H04N 21/4882 725/32 |
| 2009/0217348 A1* | 8/2009 | Salmela | .................. | H04L 63/08 726/2 |
| 2012/0213185 A1* | 8/2012 | Frid | ...................... | H04W 4/005 370/329 |

OTHER PUBLICATIONS

European Telecommunications Standards Institute, "Machine-to-Machine communications (M2M); Functional architecture," ETSI TS 102 690 V0.0.6 (Sep. 2009).

Third Generation Partnership Project, "Technical Specification Group Services and System Aspects; Study on Facilitating Machine to Machine Communication in 3GPP Systems; (Release 8)," 3GPP TR 22.868 V8.0.0 (Mar. 2007).

Third Generation Partnership Project, "Technical Specification Group Services and System Aspects; Service requirements for machine-type communications; Stage 1 (Release 10)," 3GPP TS 22.368 V0.4.0 (May 2009).

Third Generation Partnership Project, "Technical Specification Group Services and System Aspects; Service requirements for machine-type communications; Stage 1 (Release 10)," 3GPP TS 22.368 V1.0.0 (Aug. 2009).

Third Generation Partnership Project, "Technical Specification Group Services and System Aspects; Service requirements for Machine-Type Communications (MTC); Stage 1 (Release 10)," 3GPP TS 22.368 V10.2.0 (Sep. 2010).

Ericsson, "Clarification of Subscription Concepts," 3GPP TSG-SA1 #48, S1-094234, Beijing, China (Nov. 16-20, 2009).

SA WG2, "TR 23.888 v1.0.0: System Improvements for Machine-Type Communications; (Release 10)," SP-100562, TSG SA Meeting #49, San Antonia, USA (Sep. 20-23, 2010).

Third Generation Partnership Project, "Technical Specification Group Services and System Aspects; System Improvements for Machine-Type Communications; (Release 10)," 3GPP TR 23.888 V1.0.0 (Jul. 2010).

* cited by examiner

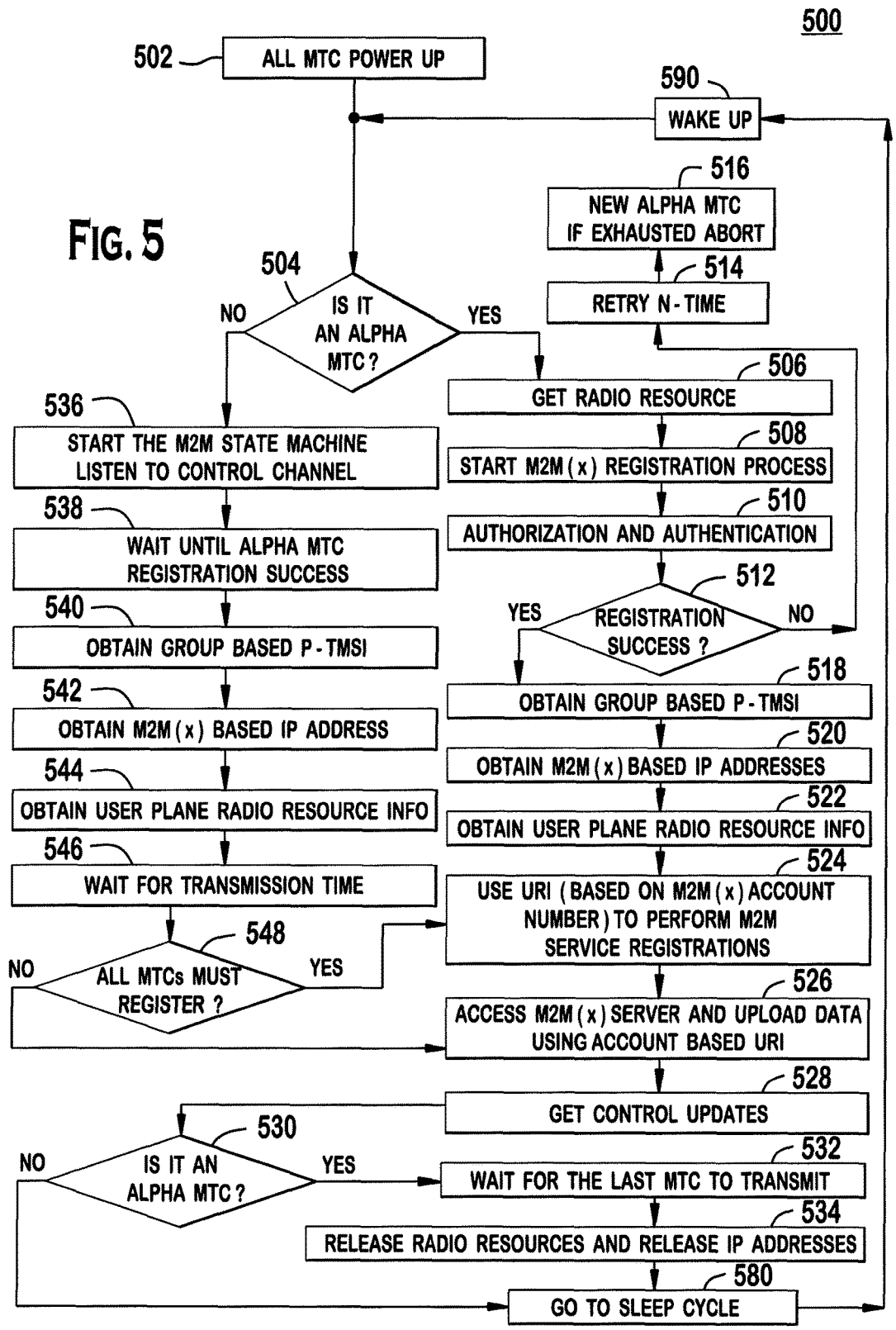

To FIG. 9B

METHOD AND APPARATUS FOR MACHINE-TO-MACHINE COMMUNICATION REGISTRATION

CROSS REFERENCE TO RELATED APPLICATIONS

This application is a continuation of U.S. application Ser. No. 12/943,321, filed Nov. 10, 2010, which claims the benefit of U.S. provisional application Nos. 61/263,578 filed Nov. 23, 2009; 61/263,758 filed Nov. 23, 2009; 61/263,980 filed Nov. 24, 2009; and 61/263,724 filed Nov. 23, 2009, the contents of which are hereby incorporated by reference herein.

FIELD OF THE INVENTION

This application is related to wireless communications.

BACKGROUND

Machine to Machine (M2M) communication (also referred to as "machine-type communications" or "MTC") may be seen as a form of data communication between entities that do not necessarily need human interaction.

In Third Generation Partnership Project (3GPP), system optimization for M2M communication may be faced with major challenges such as the explosion of M2M devices and their increased traffic load (i.e., increased number of operational and signaling procedures), potential cost of upgrades versus efficient re-use of existing infrastructure and existing access mechanisms, shortage of unique device identifiers, congestion control, and the like. System performance and capacity to support certain number of subscribers may depend on the number of simultaneous computations supported by the infrastructure which are triggered by various subscriber activities and subsequent system procedures.

SUMMARY

Methods and apparatus are disclosed for Machine to Machine (M2M) communication (also referred to as "machine-type communications" or "MTC") registration. The methods provide single and periodic registration and may be device or network based. The devices in the system may be divided into groups. For example, it may be based on geographic location. A single device member may perform the basic access steps for the group. Other devices may receive all the related access information on a control channel and use the information to access the system. The devices may send their data, get any updates, and then enter a sleep cycle. Internet addresses may be released or maintained. Two wake up cycles may be provided, one for control and one for uploading information (a reporting cycle). During the control cycle, the devices may wake up and listen to the control channel for any paging messages. Depending on the paging information, individual devices or the entire group may access the system. In the reporting cycle, all the devices may wake up and access the system to connect to the M2M system to upload data.

BRIEF DESCRIPTION OF THE DRAWINGS

A more detailed understanding may be had from the following description, given by way of example in conjunction with the accompanying drawings wherein:

FIG. 5 is an example flowchart implementing periodic registration for MTC;

DETAILED DESCRIPTION

Figure 1A:
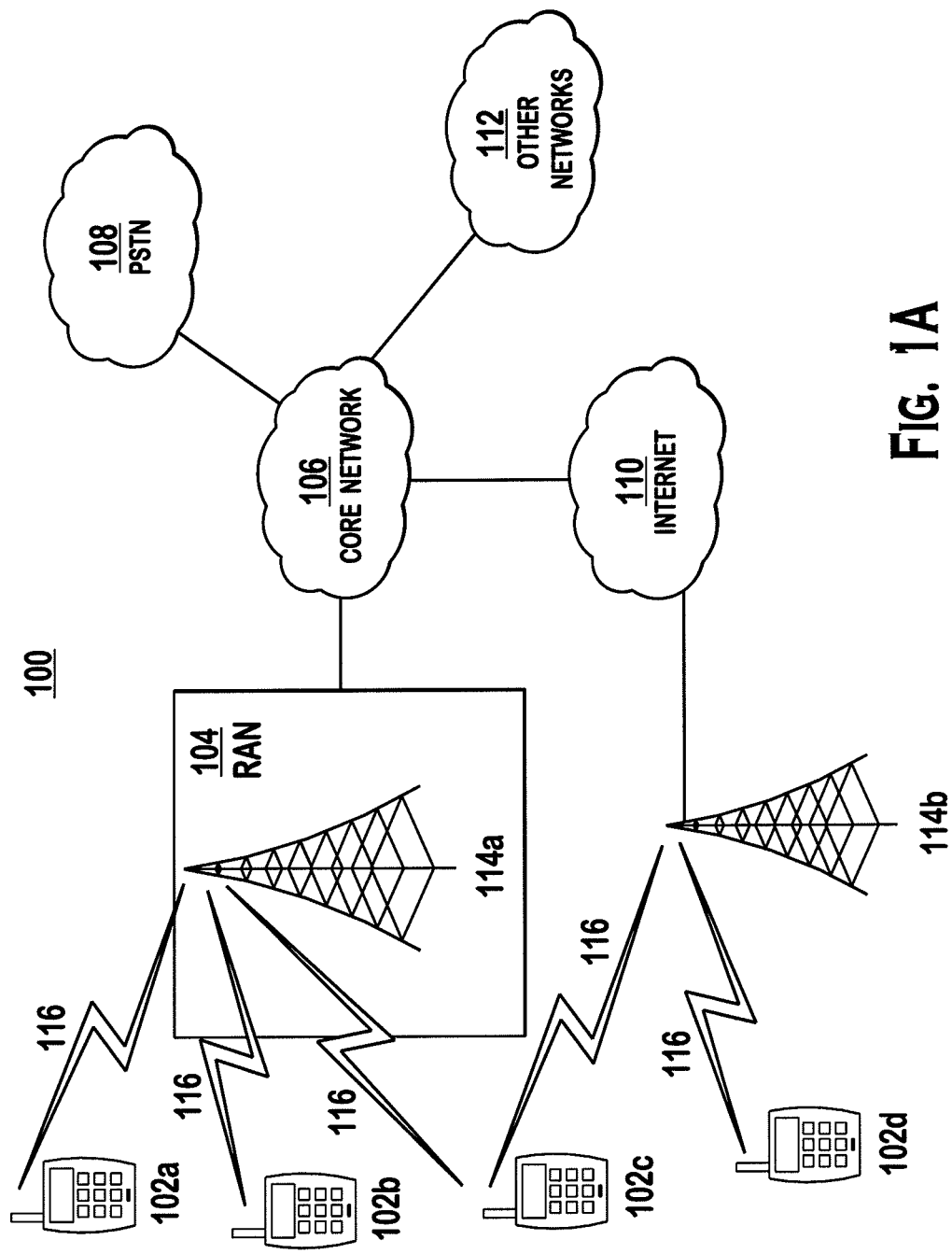
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a machine-type communication (MTC) device and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
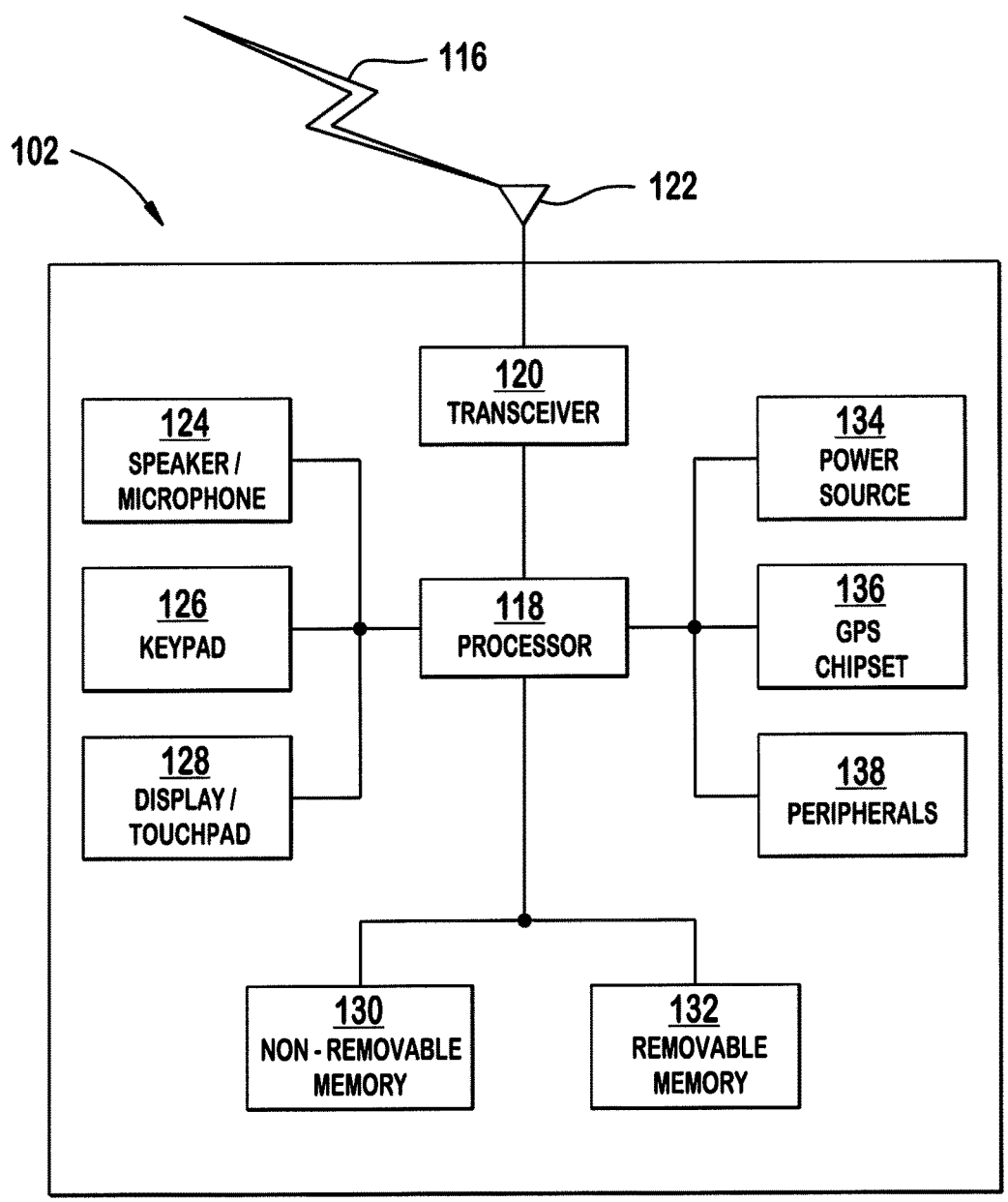
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
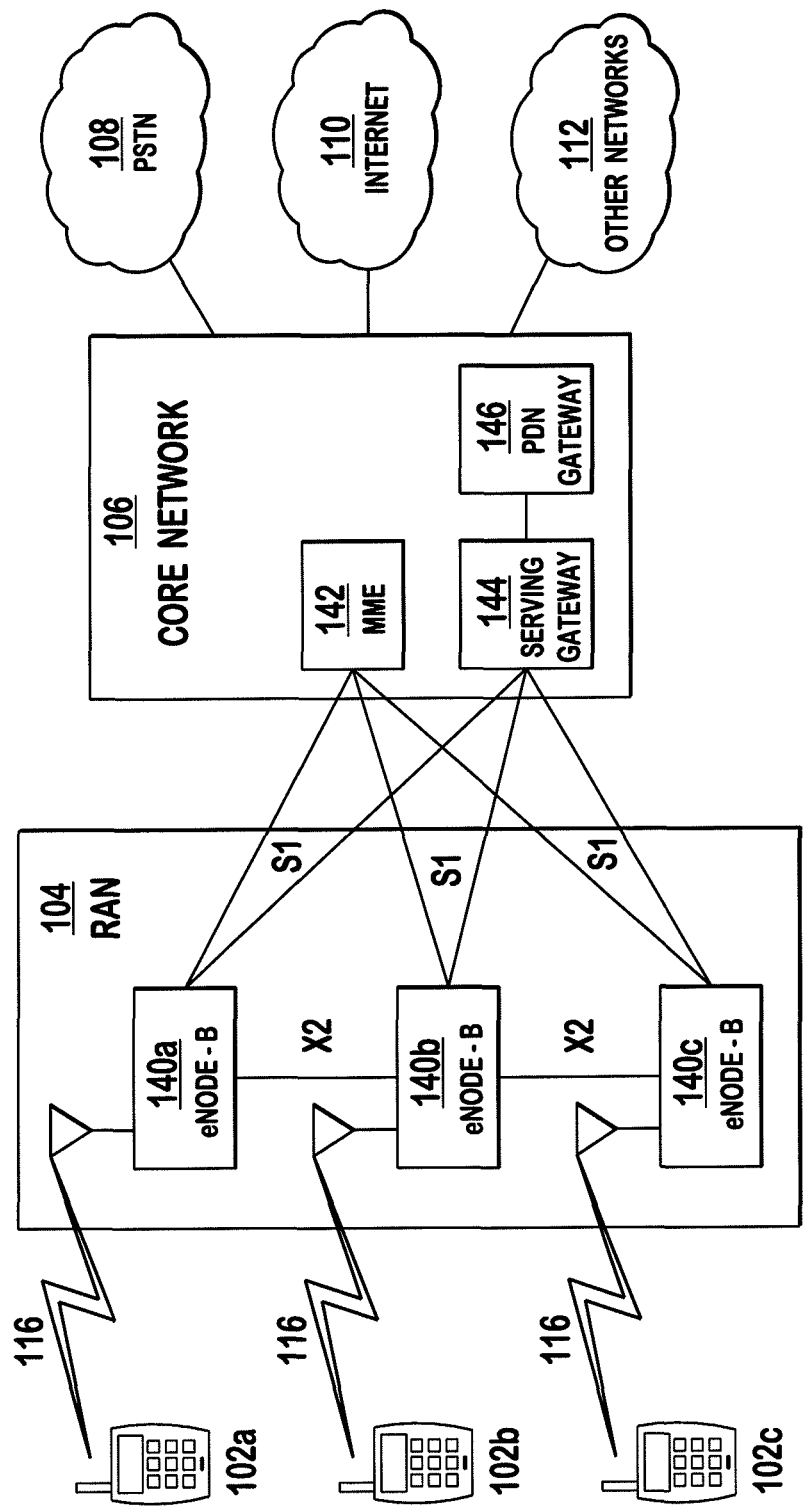
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Machine to Machine (M2M) communication (also referred to as "machine-type communications" or "MTC") may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communication may be used to implement PAYD systems in the area of car insurance. For example, an insurance company may charge a driver of a car based on the usage of the car, instead of on a fixed premium. To accomplish this, the car is equipped with a M2M wireless transmit/receive unit (WTRU), a GPS device, and various other sensors that transmit the data to the insurance company. The M2M WTRU may include a Universal Integrated Circuit Card (UICC). The insurance company may set the rate charged to the driver based on the received data. The insurance company may have a contract with the operator of the wireless network by which the M2M WTRU communicates, to allow the WTRU to use the operator's network.

In the area of tracking and tracing, a car rental company may equip a car with a M2M WTRU to obtain information about the location of the car as it is driven. In the building industry, for example, M2M WTRUs may be used to keep track of expensive tools or other equipment. In the oil industry, M2M WTRUs may be used to keep track of containers.

Many metering devices remain largely untouched after their installation. In some industries, for example, an installed meter may remain untouched for eight or more years after installation. In such a circumstance, the UICCs in the M2M WTRUs need to be protected. If this is not properly accomplished, it may be possible for the connection to the utility to be cut, thereby facilitating fraud. Additionally, if the utility and/or the operator of the wireless network by which the M2M WTRU communications change, problems may occur. For example, if the utility customer changes their utility supplier from one company to another, the new utility supplier may not have a contract with the same network operator as the original utility supplier. This circumstance may be addressed by complex accounting mechanisms, or the new utility company may need to send out a service person to install a new M2M WTRU or configure the installed M2M WTRU. However, both of these approaches are costly and error-prone.

Depending on its implementation, M2M communication may be different from some current communication models. For example, M2M communication may involve new or different market scenarios. M2M communications may also differ from some current technologies in that M2M communication may involve a large number of WTRUs, and/or may involve very little traffic per WTRU. Additionally, relative to some current technologies, M2M communication may involve lower costs and less effort to deploy.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M WTRUs. Additionally, further enhancements to these technologies may provide additional opportunities for the deployment of M2M-based solutions. Table 1 summarizes the above described implementations for MTC applications.

TABLE 1

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote | Sensors |
| Maintenance/Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Figure 2:
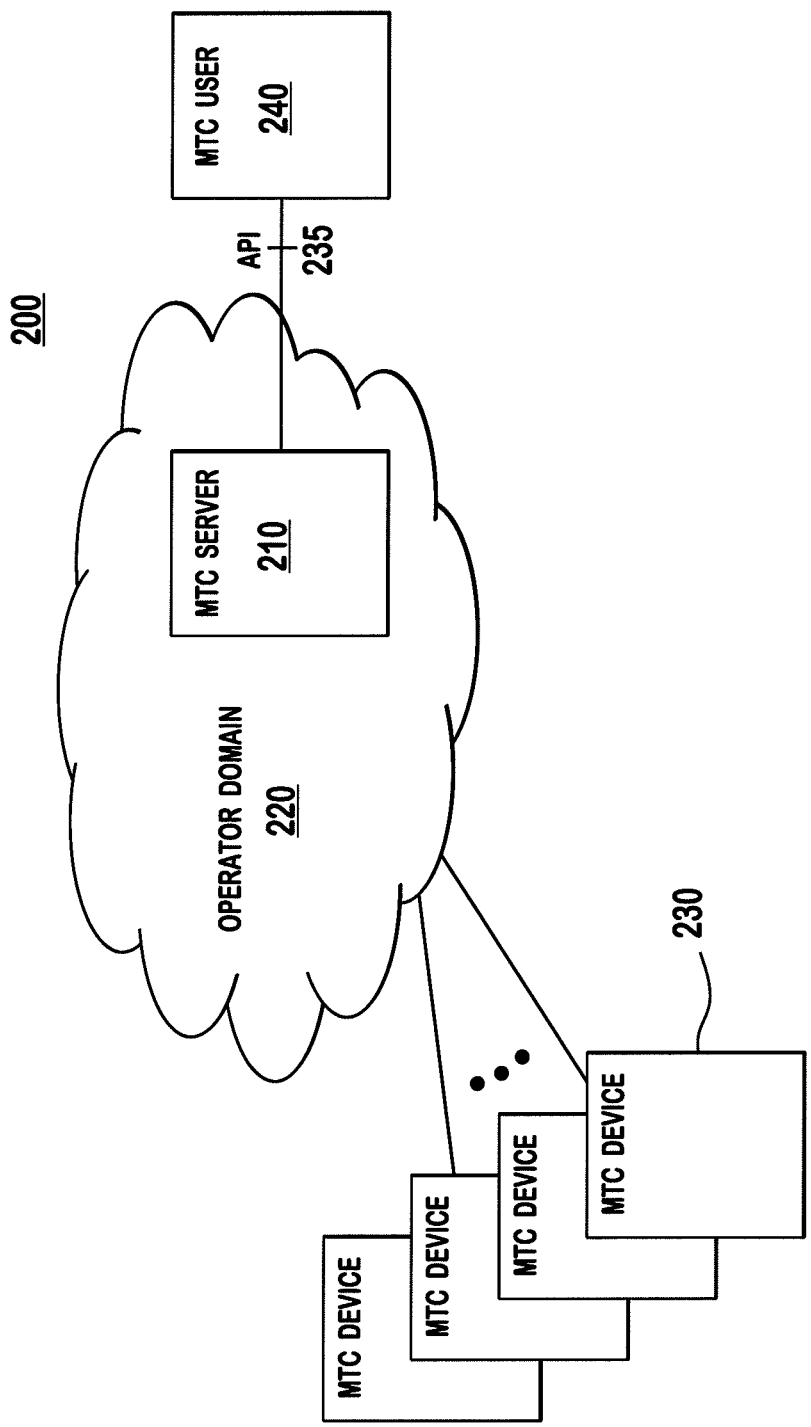
FIG. 2 is an example machine-type communication (MTC) with an MTC server within the operator domain.
Figure 3:
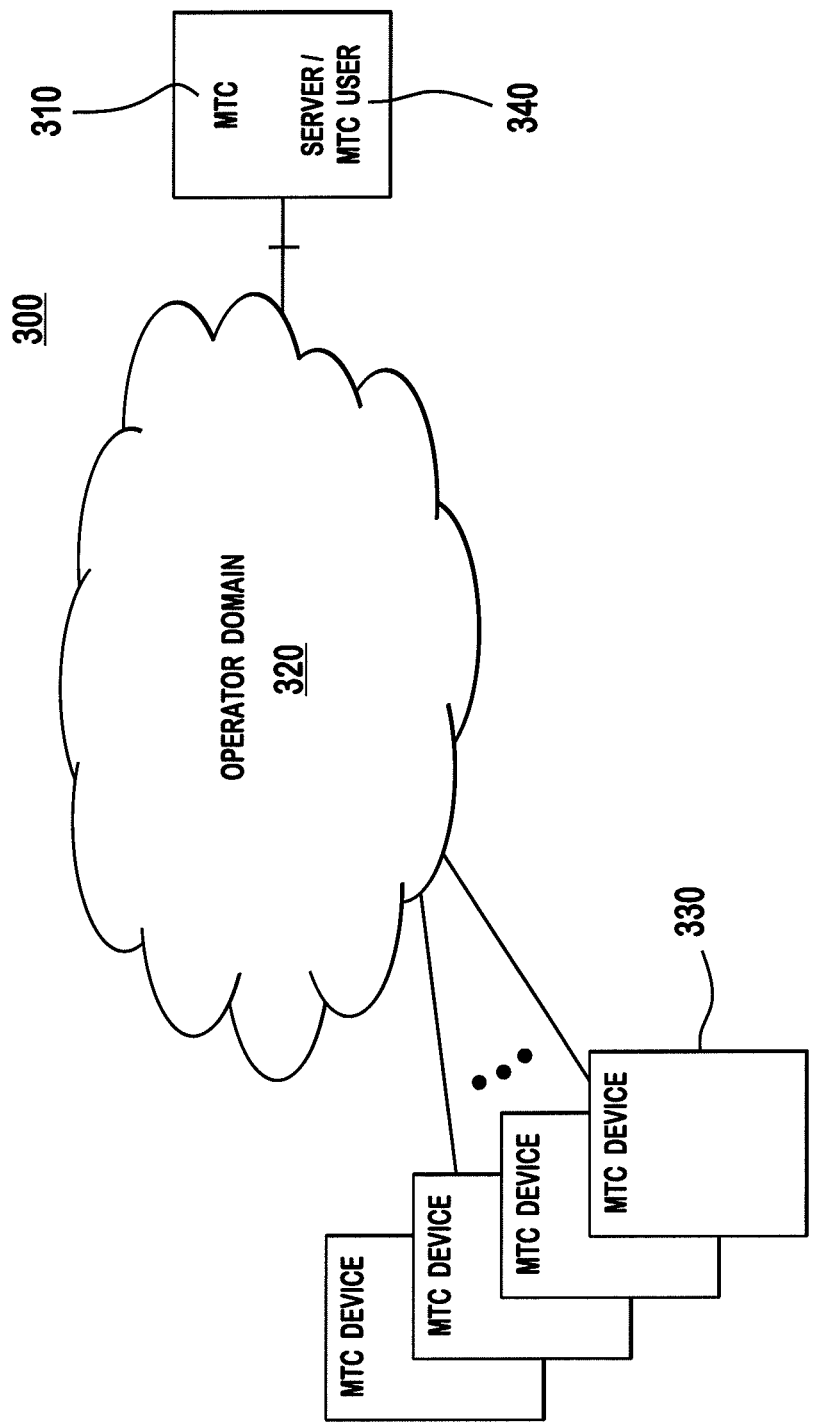
FIG. 3 is an example MTC with an MTC server outside of the operator domain.
Figure 4:
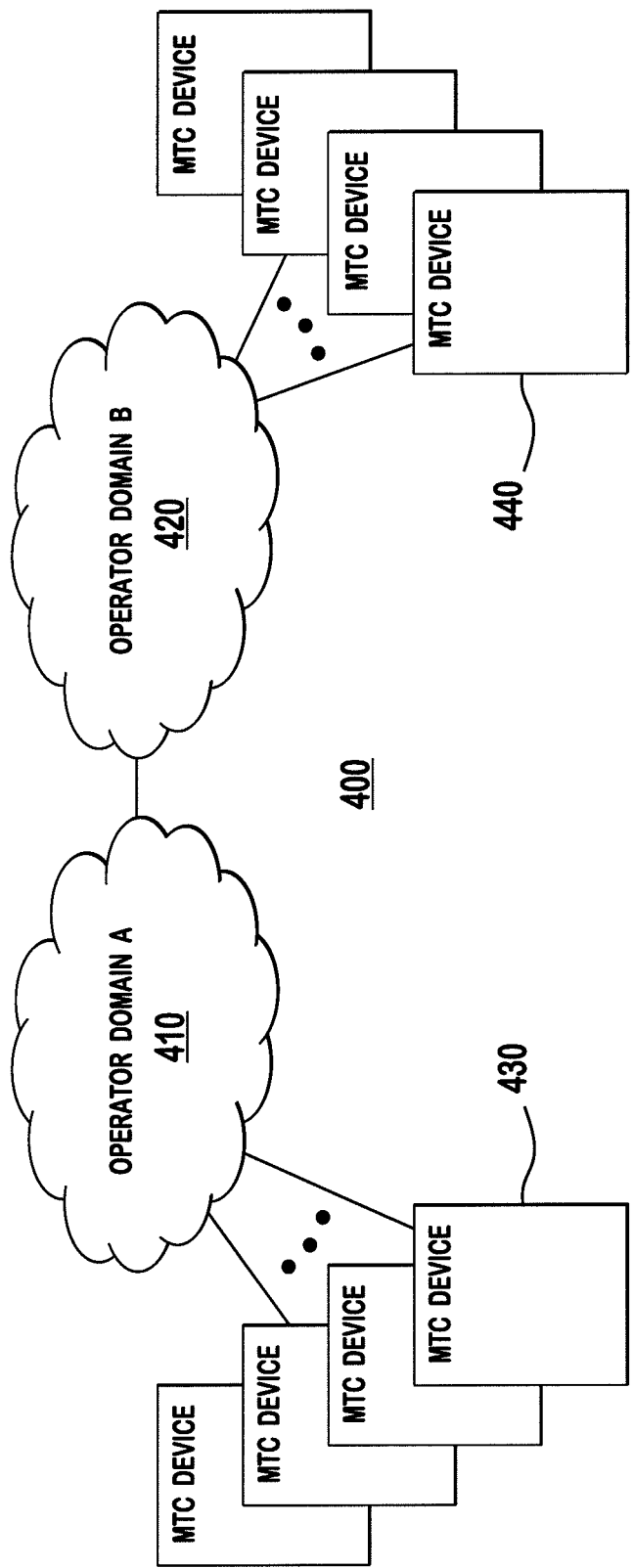
FIG. 4 is an example MTC without an MTC server.

FIGS. 2-4 show different example architectures for MTC applications. FIG. 2 shows an example MTC architecture 200 that includes an MTC server 210 inside an operator domain 220. A group of MTC devices 230 may communicate with the MTC server 210. The MTC server 210 may communicate with the public land mobile network (PLMN) and to MTC devices 230 via the PLMN. The MTC server 210 may communicate via an application programming interface (API) 235 with a MTC user 240 and may perform services for the MTC user 240. Each MTC device 230 may be a WTRU equipped for machine-type communication. The MCT server 210 may also be referred to as a machine to machine (M2M) server and a M2M operator. Although the examples and embodiments described herein refer to MTC device, the term WTRU may also be used.

FIG. 3 shows an example MTC architecture 300 that includes an MTC server 310 located outside of an operator domain 320. A group of MTC devices 330 may communicate with the MTC server 310. The MTC server 310 may be coupled to a MTC user 340. The group of MTC devices 330 may communicate through an operator domain 320, which may communicate with the MTC server 310.

FIG. 4 shows an example MTC architecture 400 wherein MTC devices may communicate directly without an intermediate MTC server. A first group of MTC devices 430 may communicate through an operator domain A 410. A second group of MTC devices 440 may communicate through operator domain B 420. Operator domain A 410 and operator domain B 420 may communicate with each other, which enables the first group of MTC devices 430 to communicate with the second group of MTC devices 440 via their respective operator domains (operator domain A 410 and operator domain B 420) without an intermediate MTC server.

FIG. 5 is an example flowchart 500 implementing a periodic registration process for MTC. In this process, a group of MTC devices may belong to the same cell, area or geographic location. The group may use a group based international mobile subscriber identity (IMSI) for 3GPP authorization and authentication and the registration process may be denied if an incorrect IMSI is provided by the MTC devices. For each group IMSI there may exist a group Mobile Subscriber Integrated Services Digital Network Number (group MSISDN) correspondent for addressing the MTC devices. Individual MTC devices within the group of MTC devices may use the same radio resources and the same internet protocol (IP) addresses to transmit their data using the same packet-temporary mobile subscriber identity (P-TMSI)/IMSI. An individual uniform resource identifier (URI) may be used as an identifier for identifying MTC devices within a group of MTC devices. The URI may be based on account numbers.

In addition, one MTC device may perform registration, for example an IMSI attachment procedure, on behalf of the MTC device group. This MTC device may be referred to as an alpha MTC device. The alpha MTC device may be selected either by the network (by polling each device separately or by sending a transmission sequence), randomly (each device selects a random number through a hashing algorithm to determine its transmission time), by pre-configurations (during initial setup of the system and the devices), or some combination thereof. The alpha MTC device may receive resources including radio resource controller (RRC) resources, a packet-temporary mobile subscriber identity (P-TMSI), internet protocol (IP) addresses and the like. In case of an alpha MTC device failure, another MTC device may perform the alpha MTC device activities. Detection of an alpha MTC device failure may be performed by the network or by the MTC devices.

The periodic registration process is applicable once all MTC devices are powered up (502). Registration is done periodically based upon a wake up cycle/sleep cycle (580, 590). Once periodic registration has been initiated, the MTC device determines if it is an alpha MTC device (504). If the MTC device is the alpha MTC device, then radio resources may be obtained (506) and the M2M(x) registration process may be initiated (508). Authorization and authentication of the alpha MTC device may then be performed (510).

The alpha MTC device then determines the success of the M2M(x) registration and/or authorization and authentication processes (512). If the M2M(x) registration process and/or authorization and authentication process are not successful, registration and authentication may be retried for a specified number of times (514). A new alpha MTC device may be designated after the specified number of retries has been exhausted (516). If the number of retries has been exhausted for the new alpha MTC device, then the M2M(x) registration and/or authorization and authentication processes may be aborted. Alternatively, if the number of retries for all designated alpha MTC devices has been exhausted, then the M2M(x) registration and/or authorization and authentication processes may be aborted.

A group based P-TMSI (518), M2M(x) based IP addresses (520), and user plane radio resource information (522) may be obtained if the M2M(x) registration and/or authorization and authentication processes has been successful. The alpha MTC device may then use a URI to perform M2M service registrations (524). The URI may be based on M2M(x) account numbers. The alpha MTC device may then access the M2M(x) server and upload data using the account based URI (526). Control information updates are then obtained by the alpha MTC device (528). The control information may be any type of control information such as configuration data and the like.

In the case where the MTC device is the alpha MTC device (530), the alpha MTC device waits for the last MTC device of the group to transmit its information to the M2M(x) server (532). After the last MTC device has transmitted or uploaded its information, the alpha MTC device may release radio resources and release IP addresses (534). The alpha MTC device then goes into a sleep cycle (580).

If the MTC device is not the alpha MTC device, then the MTC device may initiate the M2M state machine and listen to the control channel (536). Upon successful completion of the alpha MTC device registration (538), each of the non-alpha MTC devices may obtain the group based P-TMSI (540), M2M(x) based IP address (542), and user plane radio resource information (544). As stated above, each MTC device within the group of MTC devices may use the same radio resources and the same internet protocol (IP) addresses to transmit their data using the same packet-temporary mobile subscriber identity (P-TMSI)/IMSI. Each non-alpha MTC device then waits for its designated transmission time (546). The transmission time may be random, pre-configured, polling function, based on a hash function using its identifier and the like.

The non-alpha MTC device may then check, via its configuration data or the like, if the M2M operator needs each non-alpha MTC device to register with the M2M server (548). If registration may be needed, then each non-alpha MTC device may use a URI to perform M2M service registrations (524). The URI may be based on M2M(x) account numbers. The non-alpha MTC device may then access the M2M(x) server and upload data using the account based URI (526). If registration may not be needed, then each non-alpha MTC device may then access the M2M(x) server and upload data using the account based URI (526). Each non-alpha MTC device may then update its control information (528) and go into a sleep cycle (580). The sleep cycle may be followed by a wake up cycle (590), after which the periodic registration process starts again. As described herein, the wake up cycle (590) may have control cycles and reporting cycles. The wake up cycle may be scheduled by the network, randomly by the MTC devices, pre-configured and combinations thereof.

Figure 6A:
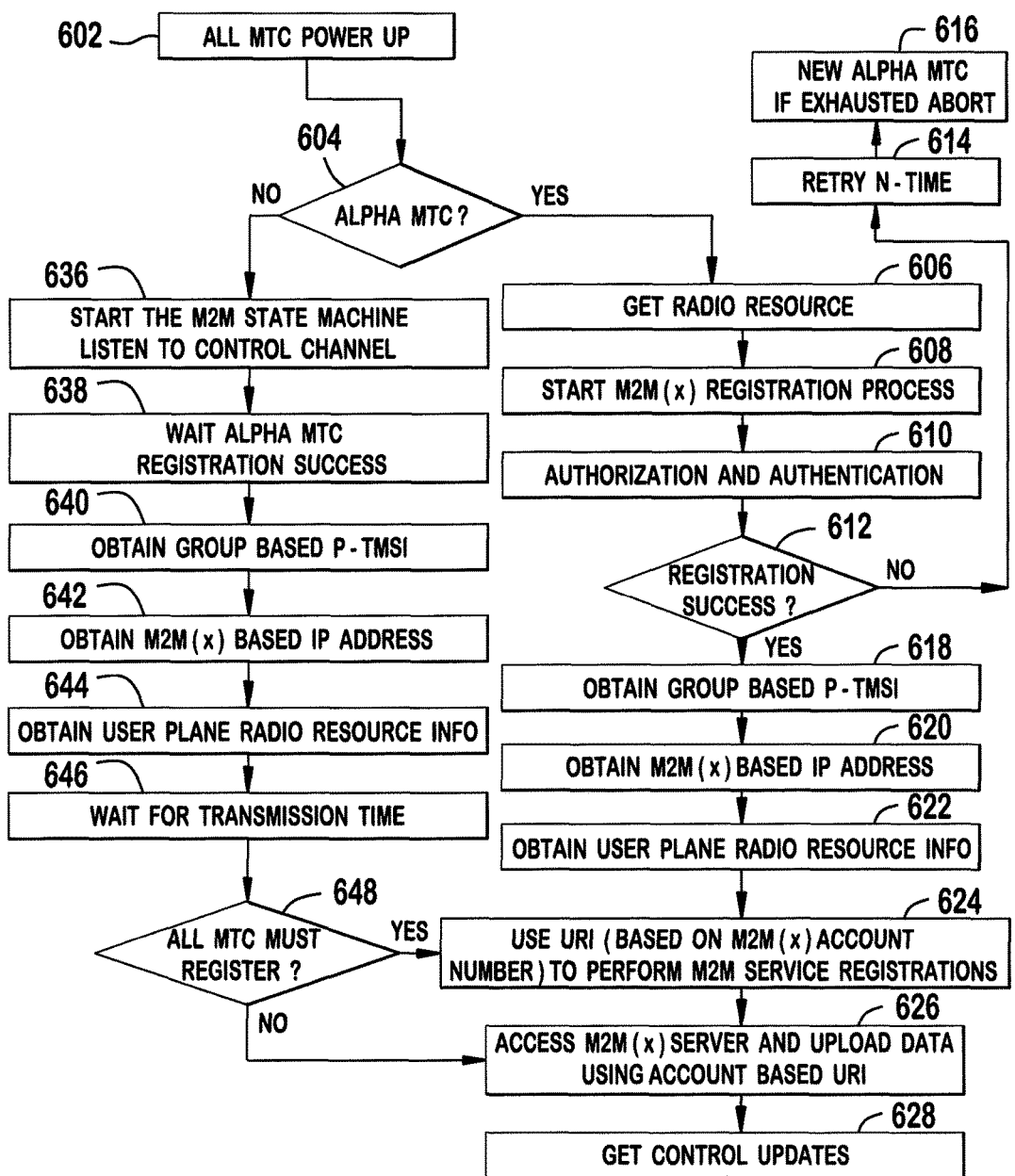
FIGS. 6A and 6B are an example flowchart implementing single registration for MTC.
Figure 6B:
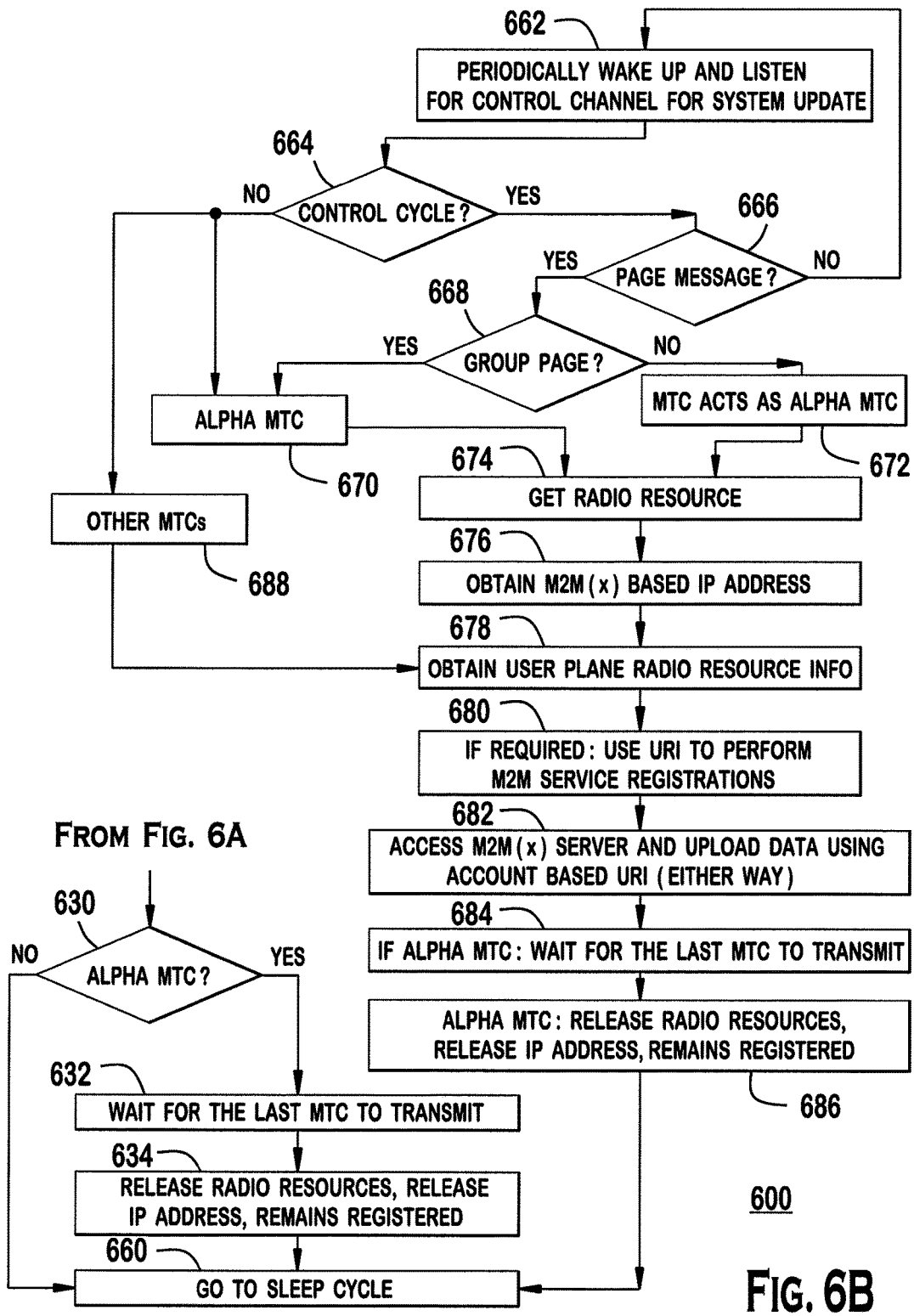

FIGS. 6A and 6B are an example flowchart 600 implementing a single registration process for MTC. Registration may be performed once upon system power up. In this process, a group of MTC devices may belong to the same cell, area or geographic location. The group may use a group based international mobile subscriber identity (IMSI) for 3GPP authorization and authentication and the registration process may be denied if an incorrect IMSI is provided by the MTC devices. Individual MTC devices within the group of MTC devices may use the same radio resources and the same internet protocol (IP) addresses to transmit their data using the same packet-temporary mobile subscriber identity (P-TMSI)/IMSI. An individual uniform resource identifier (URI) may be used as an identifier for identifying MTC devices within a group of MTC devices. The URI may be based on account numbers. Account numbers, for example, may be additional identifiers such as extensions numbers, or the like.

In addition, one MTC device may perform registration, for example an IMSI attachment procedure, on behalf of the MTC device group. This MTC device may be referred to as an alpha MTC device. The alpha MTC device may be selected either by the network, randomly, by pre-configurations, or some combination thereof. The alpha MTC device may receive resources including radio resource controller (RRC) resources, a packet-temporary mobile subscriber identity (P-TMSI), internet protocol (IP) addresses and the like. In case of an alpha MTC device failure, another MTC device may perform the alpha MTC device activities. Detection of an alpha MTC device failure may be performed by the network or by the MTC devices.

The single registration process is applicable once all MTC devices are powered up (602). Once single registration has been initiated, the MTC device determines if it is an alpha MTC device (604). If the MTC device is the alpha MTC device, then radio resources may be obtained (606) and the M2M(x) registration process may be initiated (608). Authorization and authentication of the alpha MTC device may then be performed (610).

The alpha MTC device then determines the success of the M2M(x) registration and/or authorization and authentication processes (612), where x represents a counter. If the M2M (x) registration process and/or authorization and authentication process are not successful, registration and authentication may be retried for a specified number of times (614). A new alpha MTC device may be designated after the specified number of retries has been exhausted (616). If the number of retries has been exhausted for the new alpha MTC device, then the M2M(x) registration and/or authorization and authentication processes may be aborted. Alternatively, if the number of retries for all designated alpha MTC devices has been exhausted, then the M2M(x) registration and/or authorization and authentication processes may be aborted.

A group based P-TMSI (618), M2M(x) based IP addresses (620), and user plane radio resource information (622) may be obtained if the M2M(x) registration and/or authorization and authentication processes has been successful. The alpha MTC device may then use a URI to perform M2M service registrations (624). The URI may be based on M2M(x) account numbers. The alpha MTC device may then access the M2M(x) server and upload data using the account based URI (626). Control information updates are then obtained by the alpha MTC device (628). The control information may be any type of control information such as configuration data and the like.

In the case where the MTC device is the alpha MTC device (630), the alpha MTC device waits for the last MTC device of the group to transmit its information to the M2M(x) server (632). After the last MTC device has transmitted or uploaded its information, the alpha MTC device may release radio resources and IP addresses but remains registered with the M2M operator (634). The alpha MTC device then goes into a sleep cycle (660).

If the MTC device is not the alpha MTC device, then the MTC device may initiate the M2M state machine and listen to the control channel (636). Upon successful completion of the alpha MTC device registration (638), each of the non-alpha MTC devices may obtain the group based P-TMSI (640), M2M(x) based IP address (642), and user plane radio resource information (644). As stated above, each MTC device within the group of MTC devices may use the same radio resources and the same internet protocol (IP) addresses to transmit their data using the same packet-temporary mobile subscriber identity (P-TMSI)/IMSI. Each non-alpha MTC device then waits for its designated transmission time (646). The transmission time may be random, pre-configured, polling function, based on a hash function using its identifier and the like.

The non-alpha MTC device may then check, via its configuration data or the like, if the M2M operator needs each non-alpha MTC device to register with the M2M server (648). If registration may be needed, then each non-alpha MTC device may use a URI to perform M2M service registrations (624). The URI may be based on M2M(x) account numbers. The non-alpha MTC device may then access the M2M(x) server and upload data using the account based URI (626). If registration may not be needed, then each non-alpha MTC device may then access the M2M(x) server and upload data using the account based URI (626). Each non-alpha MTC device may then update its control information (628) and go into a sleep cycle (660).

The sleep cycle (660) may then be followed by a periodic wake up cycle (662). The MTC devices wake up during the periodic wake up cycle and may also listen to a control channel for system updates. The wake up cycle may be scheduled by the network, randomly by the MTC devices, pre-configured and combinations thereof. Polling by the network may be done using control channel signaling or using traffic channel in-band signaling. The wake up cycle may have control cycles and reporting cycles. In control cycles where the MTC device groups wakes up, the MTC devices may not have to register again with a 3GPP system control channel and may wait for any updates on the control channel. An IP address may or may not be allocated during the control cycle. Each individual MTC device may be updated using a paging/broadcast message using IMSI/P-TMSI+account numbers. If paged and instructed to connect, an individual MTC device may perform system access requesting RRC connection and IP allocation to connect to the M2M Access Server (M2M AS). In reporting cycles, control may be performed using the traffic channel signaling on top of IP. For example, if the system needs to perform maintenance operations, software upgrades or download new information/configuration, then these operations may be done during the reporting period after or before the devices upload their data to the system. Individual MTC devices may be allocated different Local IP addresses within 3GPP for the duration of a reporting cycle. Additional IP addresses may be allocated in order to allow for multiple simultaneous accesses for the group to reduce the reporting time.

In particular, each MTC device determines if the wake up cycle is a control cycle or a reporting cycle (664). If it is a control cycle, the MTC device determines if a page/broadcast message has been sent as discussed above (666). If a page/broadcast message has not been sent, then the MTC device goes back into the sleep cycle and waits for the next wake up cycle (662). If a page/broadcast message has been sent, the group identifier (e.g., group MSISDN) matches those of the group, then the MTC device determines if it is a group page (668). If it is a group page/broadcast, then the MTC device is an alpha MTC device (670) and if it is not a group page/broadcast, then the MTC device acts as an alpha MTC device (672). The information in the page/broadcast may specify a single device or it may be addressed to the group. In the latter case, the alpha device which may be previously configured would respond. Other devices (not alpha) would wait to start their transmission. This may depend on system setup configuration. In either case, the alpha or acting alpha MTC device may then obtain radio resources (674), obtain M2M(x) based IP address (676), and obtain user plane radio resource information (678).

The alpha or acting alpha MTC device may then check, via its configuration data or the like, if the M2M operator needs the alpha or acting alpha MTC device to register with the M2M operator (680). If registration may be needed, then the alpha or acting alpha MTC device may use a URI to perform M2M service registrations. In either case, the alpha or acting alpha MTC device may then access the M2M(x) server and upload data using the account based URI (682). The alpha or acting alpha MTC device waits for the last MTC device of the group to transmit (684). After the last MTC device has transmitted or uploaded its information, the alpha or acting alpha MTC device may release radio resources and IP addresses but remains registered with the M2M operator (686). The alpha or acting alpha MTC device then goes into a sleep cycle (660).

If it is a reporting cycle and the MTC device is an alpha MTC device (670), then the alpha MTC device may then obtain radio resources (674), obtain M2M(x) based IP address (676), and obtain user plane radio resource information (678). The alpha MTC device may then check, via its configuration data or the like, if the M2M operator needs the alpha MTC device to register with the M2M operator (680). If registration may be needed, then the alpha MTC device may use a URI to perform M2M service registrations. The alpha MTC device may then access the M2M(x) server and upload data using the account based URI (682). The alpha MTC device then waits for the last MTC device of the group to transmit (684). After the last MTC device has transmitted or uploaded its information, the alpha MTC device may then release radio resources and IP addresses but remains registered with the M2M operator (686). The alpha MTC device then goes into a sleep cycle (660).

If it is a reporting cycle and the MTC device is a non-alpha MTC device (688), then the non-alpha MTC device obtains user plane radio resource information (678). The non-alpha MTC device may then check, via its configuration data or the like, if the M2M operator needs each non-alpha MTC device to register with the M2M operator (680). If registration may be needed, then each non-alpha MTC device may use a URI to perform M2M service registrations. In either case, the non-alpha MTC device may then access the M2M(x) server and upload data using the account based URI (682). The non-alpha MTC device may then go into a sleep cycle (660).

Figure 7A:
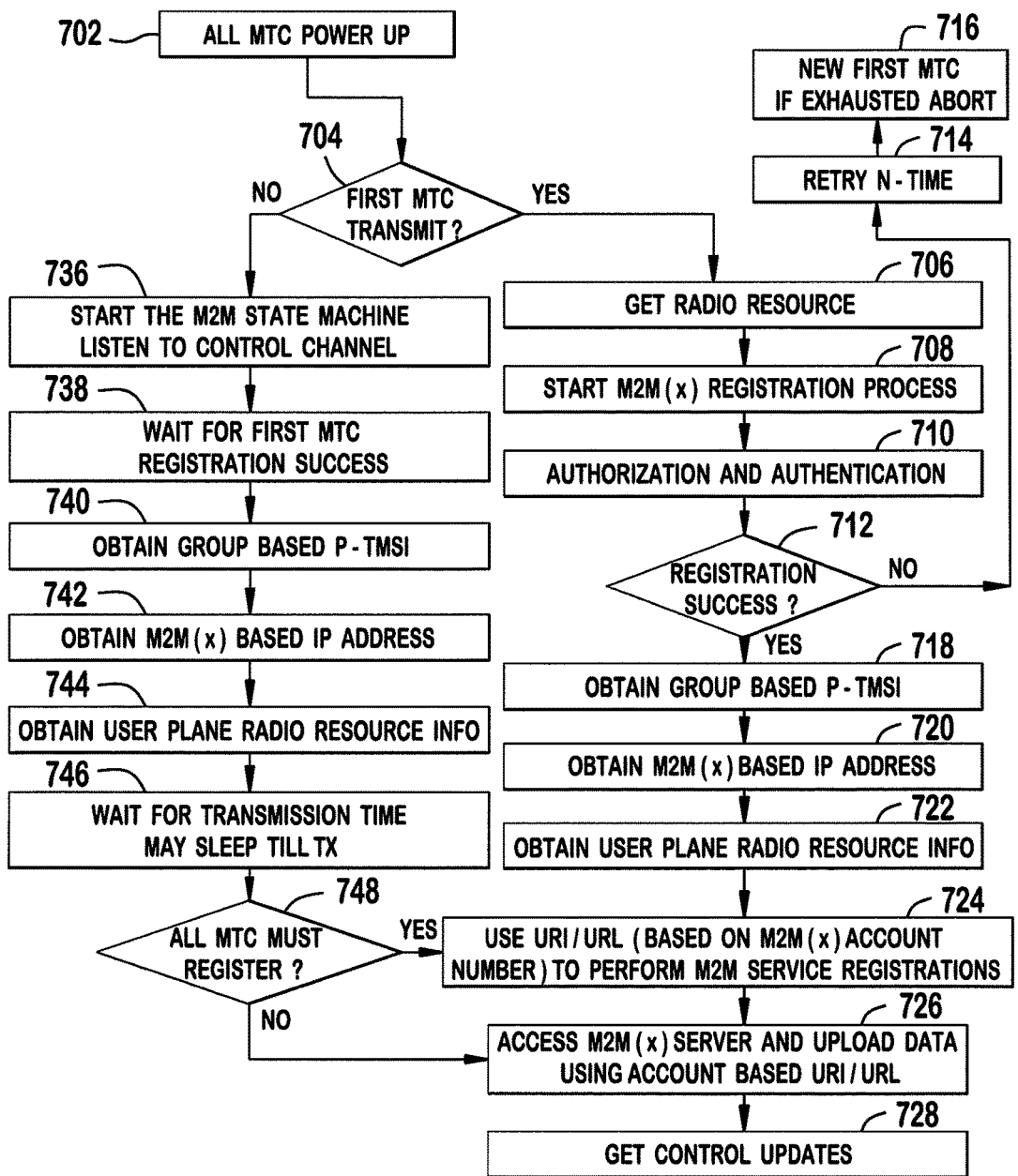
FIGS. 7A and 7B are another example flowchart implementing single registration for MTC including Internet Protocol (IP) address release during a sleep cycle.
Figure 7B:
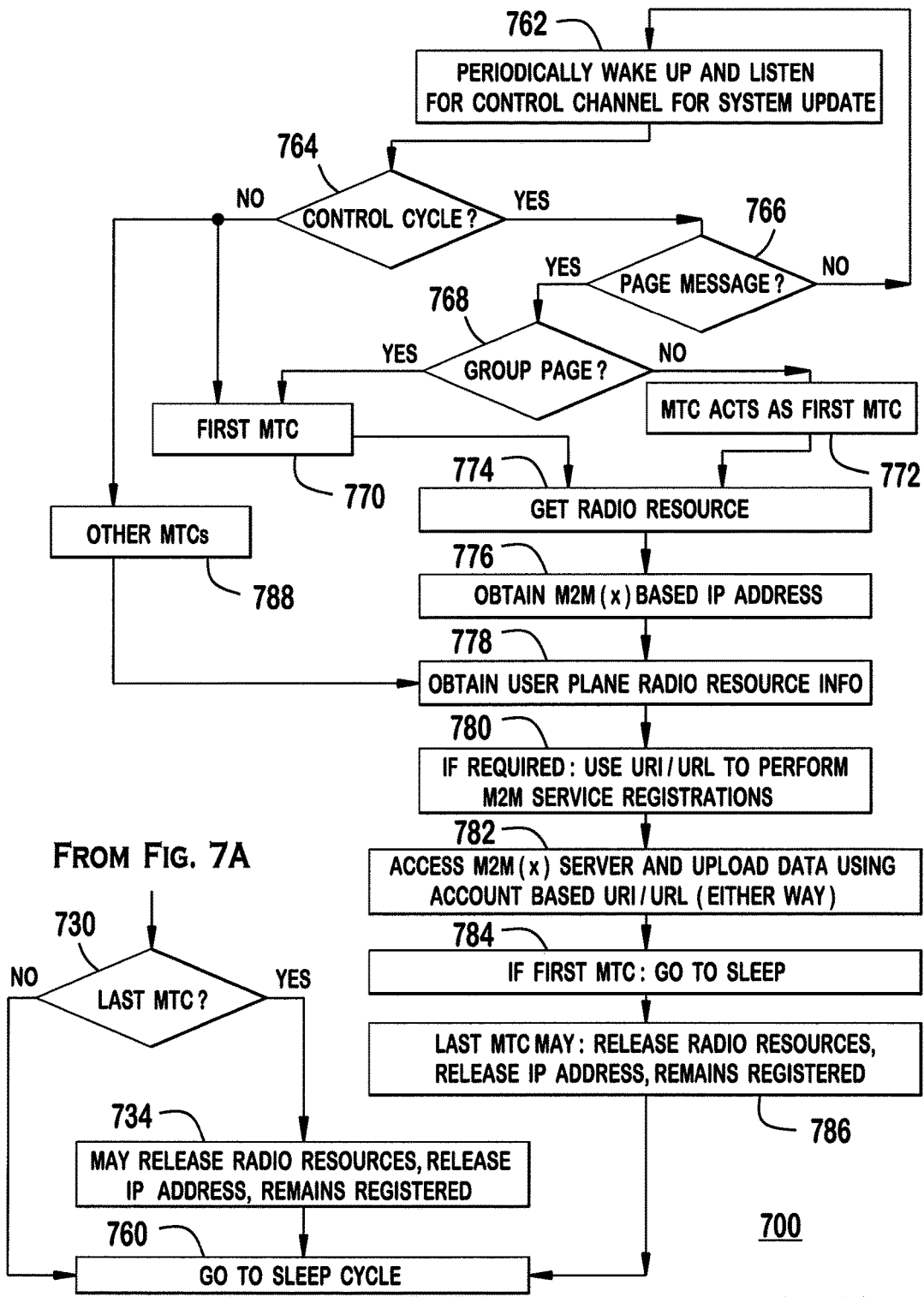

FIGS. 7A and 7B is an example flowchart 700 implementing an example registration process for MTC that releases IP connections during sleep cycles. Registration may be performed once upon system power up. In this process, a group of MTC devices may belong to the same cell, area or geographic location. The group may use a group based international mobile subscriber identity (IMSI) for 3GPP authorization and authentication and the registration process may be denied if an incorrect IMSI is provided by the MTC devices. Individual MTC devices within the group of MTC devices may use the same radio resources and the same internet protocol (IP) addresses to transmit their data using the same packet-temporary mobile subscriber identity (P-TMSI)/IMSI. An individual uniform resource identifier (URI) may be used as an identifier for identifying MTC devices within a group of MTC devices. The URI may be based on account numbers.

In addition, a first MTC device may perform registration, for example an IMSI attachment procedure, on behalf of the MTC device group. The first MTC device may be selected either by the network, randomly, hash algorithms, by pre-configurations, or some combination thereof. The first MTC device may receive resources including radio resource controller (RRC) resources, a packet-temporary mobile subscriber identity (P-TMSI), internet protocol (IP) addresses and the like. In case of first MTC device failure, another MTC device may perform the first MTC device activities. Detection of first MTC device failure may be performed by the network or by the MTC devices. A last MTC device may be used to release radio resources and IP addresses, maintain registration with the M2M operator and conclude the current cycle.

The registration process may be applicable once all MTC devices are powered up (702). Once registration has been initiated, the MTC device determines if it is a first MTC device (704). If the MTC device is the first MTC device, then radio resources may be obtained (706) and the M2M(x) registration process may be initiated (708). Authorization and authentication of the first MTC device may then be performed (710). As described herein, MTC devices may be separated into controlling/master devices (alpha) and others. In this case, there may be more than one master device, one device to start the system access (first MTC) and another that acts to terminate the connections and release resources at the end of operation (last device).

The first MTC device then determines the success of the M2M(x) registration and/or authorization and authentication processes (712). If the M2M(x) registration process and/or authorization and authentication process are not successful, registration and authentication may be retried for a specified number of times (714). A new first MTC device may be designated after the specified number of retries has been exhausted (716). If the number of retries has been exhausted for the new first MTC device, then the M2M(x) registration and/or authorization and authentication processes may be aborted. Alternatively, if the number of retries for all designated first MTC devices has been exhausted, then the M2M(x) registration and/or authorization and authentication processes may be aborted.

A group based P-TMSI (718), M2M(x) based IP addresses (720), and user plane radio resource information (722) may be obtained if the M2M(x) registration and/or authorization and authentication processes has been successful. The first MTC device may then use a URI or uniform resource locator (URL) to perform M2M service registrations (724). The URI may be based on M2M(x) account numbers. The first MTC device may then access the M2M(x) server and upload data using the account based URI or URL (726). Control information updates are then obtained by the first MTC device (728). The control information may be any type of control information such as configuration data and the like. In this case, since the first MTC device is not the last MTC device (730), the first MTC device goes into a sleep cycle (760).

If the MTC device is not the first MTC device, then the MTC device may initiate the M2M state machine and listen to the control channel (736). Upon successful completion of the first MTC device registration (738), each of the non-first MTC devices may obtain the group based P-TMSI (740), M2M(x) based IP address (742), and user plane radio resource information (744). As stated above, each MTC device within the group of MTC devices may use the same radio resources and the same internet protocol (IP) addresses to transmit their data using the same packet-temporary mobile subscriber identity (P-TMSI)/IMSI. Each non-first MTC device then waits for its designated transmission time (746). The transmission time may be random, pre-configured, polling function, based on a hash function using its identifier and the like. The non-first MTC device may sleep until its designated transmission time.

The non-first MTC device may then check, via its configuration data or the like, if the M2M operator needs each non-first MTC device to register with the M2M server (748). If registration may be needed, then each non-first MTC device may use a URI or URL to perform M2M service registrations (724). The URI may be based on M2M(x) account numbers. The non-first MTC device may then access the M2M(x) server and upload data using the account based URI or URL (726). If registration may not be needed, then each non-first MTC device may then access the M2M (x) server and upload data using the account based URI or URL (726). Each non-first MTC device may then update its control information (728). If the non-first MTC device is not last MTC device (730), the non-first MTC device may go into a sleep cycle (760). If the non-first MTC device is the last MTC device, then the last MTC device may release radio resources and IP addresses but remains registered with the M2M operator (734). The last MTC device may then go into a sleep cycle (760).

The sleep cycle (760) may then be followed by a periodic wake up cycle (762). The MTC devices wake up during the periodic wake up cycle and may also listen to a control channel for system updates. The wake up cycle may be scheduled by the network, randomly by the MTC devices, pre-configured and combinations thereof. Polling by the network may be done using control channel signaling or using traffic channel in-band signaling. The wake up cycle may have control cycles and reporting cycles. In control cycles where the MTC device groups wakes up, the MTC devices may not have to register again with a 3GPP system control channel and may wait for any updates on the control channel. An IP address may or may not be allocated during the control cycle. Each individual MTC device may be updated using a paging/broadcast message using IMSI/P-TMSI+account numbers. If paged and instructed to connect, an individual MTC device may perform system access requesting RRC connection and IP allocation to connect to the M2M Access Server (M2M AS). The M2M AS may also be referred to as a M2M gateway or MTC gateway. In reporting cycles, control may be performed using the traffic channel signaling on top of IP. For example, the MTC device may be connected to the server and reachable directly for any updates or maintenance operations. There may be no need to wait for another time to perform these operations. Individual MTC devices may be allocated different Local IP addresses within 3GPP for the duration of a reporting cycle.

In particular, each MTC device determines if the wake up cycle is a control cycle or a reporting cycle (764). If it is a control cycle, the MTC device determines if a page message has been sent as discussed above (766). If a page message has not been sent, then the MTC device goes back into the sleep cycle and waits for the next wake up cycle (762). If a page message has been sent, then the MTC device determines if it is a group page (768). If it is a group page, then the MTC device is a first MTC device (770) and if it is not a group page, then the MTC device acts as a first MTC device (772). In either case, the first or acting first MTC device may then obtain radio resources (774), obtain M2M (x) based IP address (776), and obtain user plane radio resource information (778).

The first or acting first MTC device may then check, via its configuration data or the like, if the M2M operator needs the first or acting first MTC device to register with the M2M operator (780). If registration may be needed, then the first or acting first MTC device may use a URI or URL to perform M2M service registrations. In either case, the first or acting first MTC device may then access the M2M(x) server and upload data using the account based URI or URL (782). The first or acting first MTC device may then go into the sleep cycle (760).

If it is a reporting cycle (764) and the MTC device is a first MTC device (770), then the first MTC device may then obtain radio resources (774), obtain M2M(x) based IP address (776), and obtain user plane radio resource information (778). The first MTC device may then check, via its configuration data or the like, if the M2M operator needs the first MTC device to register with the M2M operator (780). If registration may be needed, then the first MTC device may use a URI or URL to perform M2M service registrations. The first MTC device may then access the M2M(x) server and upload data using the account based URI or URL (782). The first MTC device may then go into the sleep cycle (784).

If it is a reporting cycle and the MTC device is a non-first MTC device (788), then the non-first MTC device obtains user plane radio resource information (778). The non-first MTC device may then check, via its configuration data or the like, if the M2M operator needs each non-first MTC device to register with the M2M operator (780). If registration may be needed, then each non-first MTC device may use a URI or URL to perform M2M service registrations. In either case, the non-first MTC device may then access the M2M(x) server and upload data using the account based URI or URL (782). The non-first MTC device may then go into a sleep cycle (784). If the non-first MTC device is the last MTC device, then the non-first but last MTC device may release radio resources and IP addresses but remain registered with the M2M operator (786). If the non-first MTC device is not the last MTC device, then the non-first MTC device may go into a sleep cycle.

Figure 8A:
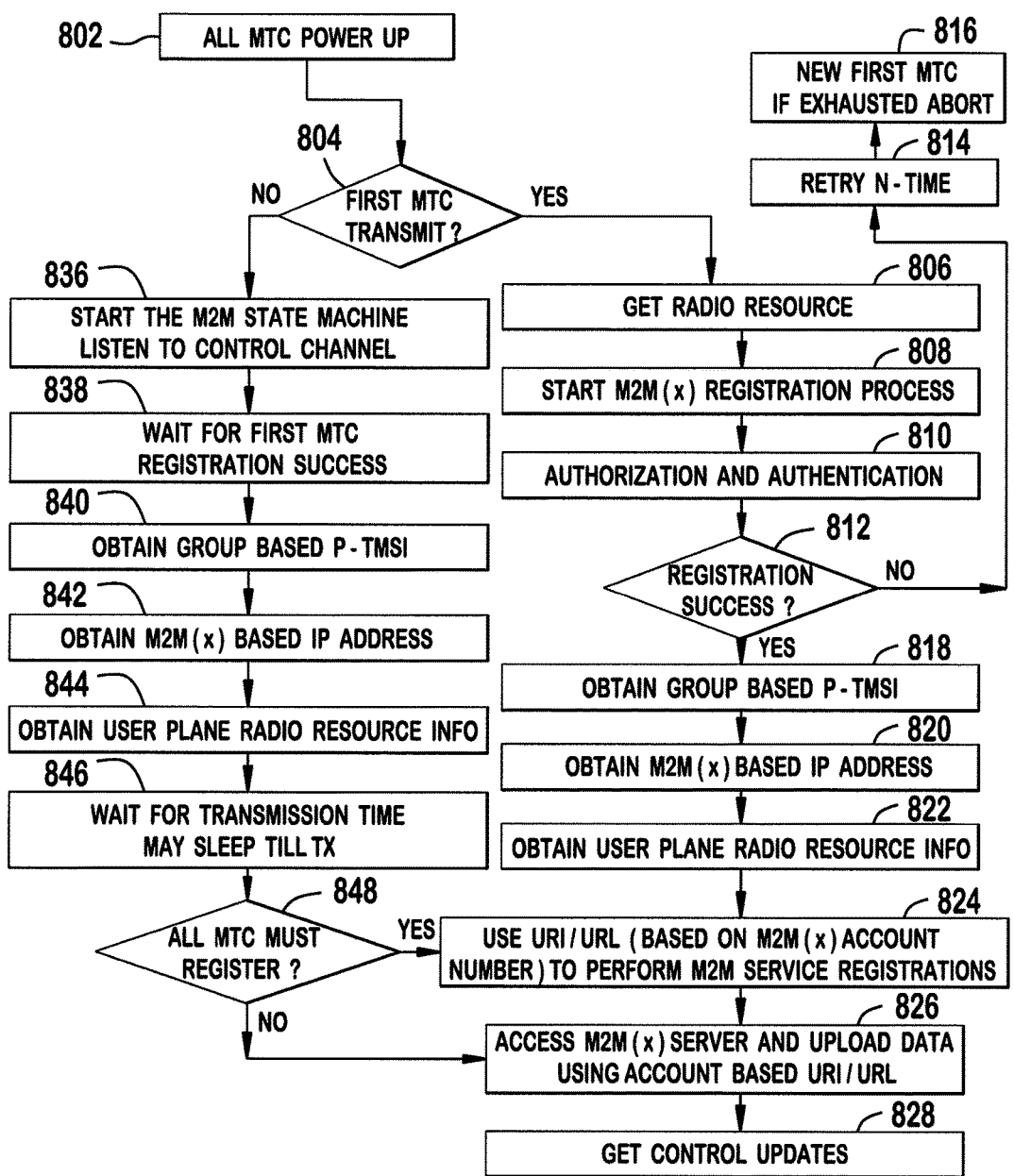
FIGS. 8A and 8B are another example flowchart implementing single registration for MTC including maintaining IP address during a sleep cycle.
Figure 8B:
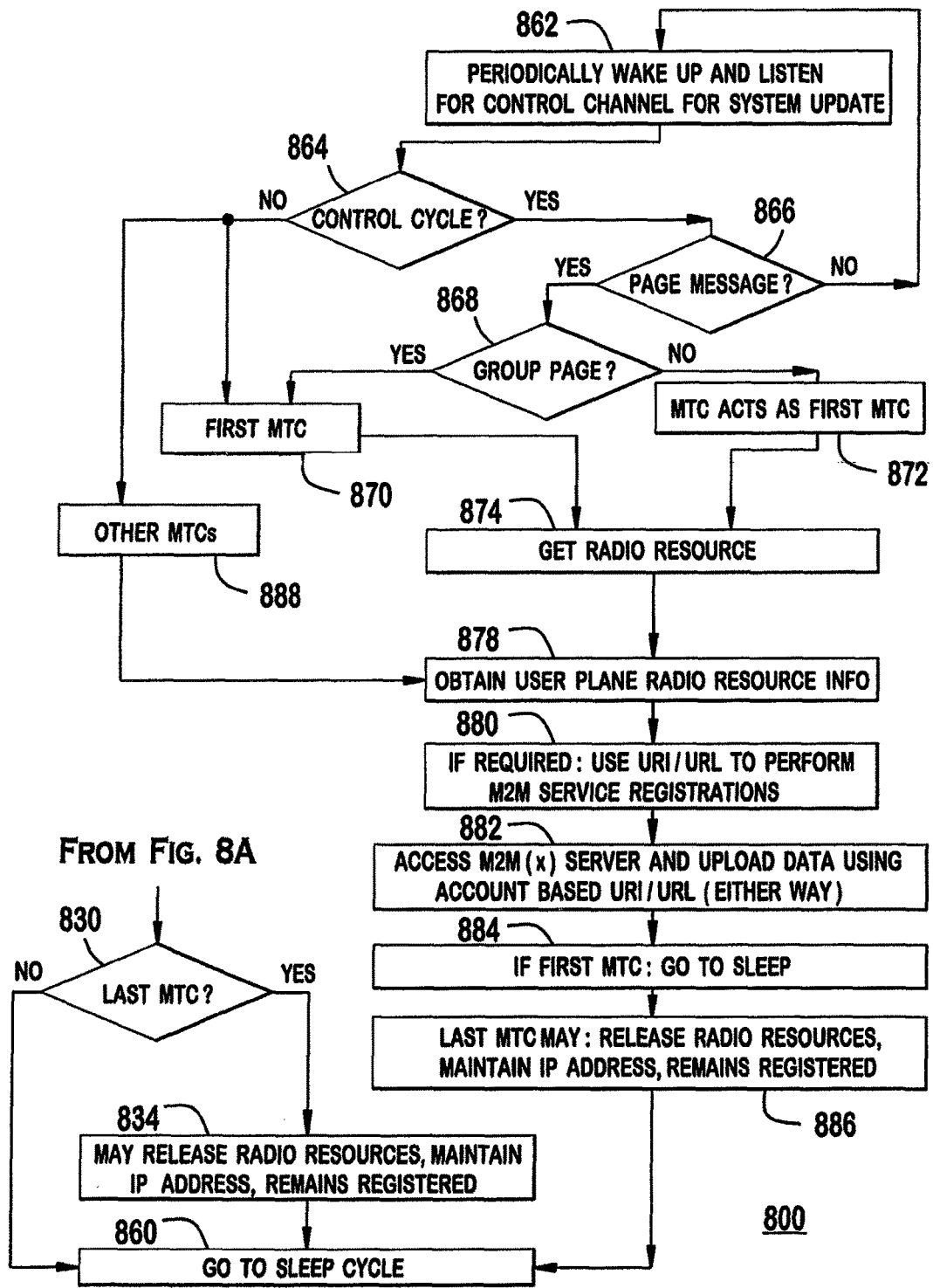

FIGS. 8A and 8B are an example flowchart 800 implementing an example registration process for MTC that maintains the IP connection during sleep cycles. Registration may be performed once upon system power up. In this process, a group of MTC devices may belong to the same cell, area or geographic location. The group may use a group based international mobile subscriber identity (IMSI) for 3GPP authorization and authentication and the registration process may be denied if an incorrect IMSI is provided by the MTC devices. Individual MTC devices within the group of MTC devices may use the same radio resources and the same internet protocol (IP) addresses to transmit their data using the same packet-temporary mobile subscriber identity (P-TMSI)/IMSI. An individual uniform resource identifier (URI) may be used as an identifier for identifying MTC devices within a group of MTC devices. The URI may be based on account numbers.

In addition, a first MTC device may perform registration, for example an IMSI attachment procedure, on behalf of the MTC device group. The first MTC device may be selected either by the network, randomly, hash algorithms, by pre-configurations, or some combination thereof. The first MTC device may receive resources including radio resource controller (RRC) resources, a packet-temporary mobile subscriber identity (P-TMSI), internet protocol (IP) addresses and the like. In case of first MTC device failure, another MTC device may perform the first MTC device activities. Detection of first MTC device failure may be performed by the network or by the MTC devices. A last MTC device may be used to release radio resources and maintain IP addresses and registration with the M2M operator.

The registration process may be applicable once all MTC devices are powered up (802). Once registration has been initiated, the MTC device determines if it is a first MTC device (804). If the MTC device is the first MTC device, then radio resources may be obtained (806) and the M2M(x) registration process may be initiated (808). Authorization and authentication of the first MTC device may then be performed (810).

The first MTC device then determines the success of the M2M(x) registration and/or authorization and authentication processes (812). If the M2M(x) registration process and/or authorization and authentication process are not successful, registration and authentication may be retried for a specified number of times (814). A new first MTC device may be designated after the specified number of retries has been exhausted (816). If the number of retries has been exhausted for the new first MTC device, then the M2M(x) registration and/or authorization and authentication processes may be aborted. Alternatively, if the number of retries for all designated first MTC devices has been exhausted, then the M2M(x) registration and/or authorization and authentication processes may be aborted.

A group based P-TMSI (818), M2M(x) based IP addresses (820), and user plane radio resource information (822) may be obtained if the M2M(x) registration and/or authorization and authentication processes has been successful. The first MTC device may then use a URI or uniform resource locator (URL) to perform M2M service registrations (824). The URI may be based on M2M(x) account numbers. The first MTC device may then access the M2M(x) server and upload data using the account based URI or URL (826). Control information updates are then obtained by the first MTC device (828). The control information may be any type of control information such as configuration data and the like. In this case, since the first MTC device is not the last MTC device (830), the first MTC device goes into a sleep cycle (860).

If the MTC device is not the first MTC device, then the MTC device may initiate the M2M state machine and listen to the control channel (836). Upon successful completion of the first MTC device registration (838), each of the non-first MTC devices may obtain the group based P-TMSI (840), M2M(x) based IP address (842), and user plane radio resource information (844). As stated above, each MTC device within the group of MTC devices may use the same radio resources and the same internet protocol (IP) addresses to transmit their data using the same packet-temporary mobile subscriber identity (P-TMSI)/IMSI. Each non-first MTC device then waits for its designated transmission time (846). The transmission time may be random, pre-configured, polling function, based on a hash function using its identifier and the like. The non-first MTC device may sleep until its designated transmission time.

The non-first MTC device may then check, via its configuration data or the like, if the M2M operator needs each non-first MTC device to register with the M2M server (848). If registration may be needed, then each non-first MTC device may use a URI or URL to perform M2M service registrations (824). The URI may be based on M2M(x) account numbers. The non-first MTC device may then access the M2M(x) server and upload data using the account based URI or URL (826). If registration may not be needed, then each non-first MTC device may then access the M2M (x) server and upload data using the account based URI or URL (826). Each non-first MTC device may then update its control information (828). If the non-first MTC device is not last MTC device (830), the non-first MTC device may go into a sleep cycle (860). If the non-first MTC device is the last MTC device, then the last MTC device may release radio resources and maintain IP addresses and registration with the M2M operator (834). The last MTC device may then go into a sleep cycle (860).

The sleep cycle (860) may then be followed by a periodic wake up cycle (862). The MTC devices wake up during the periodic wake up cycle and may also listen to a control channel for system updates. The wake up cycle may be scheduled by the network, randomly by the MTC devices, pre-configured and combinations thereof. Polling by the network may be done using control channel signaling or using traffic channel in-band signaling. The wake up cycle may have control cycles and reporting cycles. In control cycles where the MTC device groups wakes up, the MTC devices may not have to register again with a 3GPP system control channel and may wait for any updates on the control channel. An IP address may or may not be allocated during the control cycle. Each individual MTC device may be updated using a paging/broadcast message using IMSI/P-TMSI+account numbers. If paged and instructed to connect, an individual MTC device may perform system access requesting RRC connection and IP allocation to connect to the M2M Access Server (M2M AS). The M2M AS may also be referred to as a M2M gateway or MTC gateway. In reporting cycles, control may be performed using the traffic channel signaling on top of IP. Individual MTC devices may be allocated different Local IP addresses within 3GPP for the duration of a reporting cycle.

In particular, each MTC device determines if the wake up cycle is a control cycle or a reporting cycle (864). If it is a control cycle, the MTC device determines if a page message has been sent as discussed above (866). If a page message has not been sent, then the MTC device goes back into the sleep cycle and waits for the next wake up cycle (862). If a page message has been sent, then the MTC device determines if it is a group page (868). If it is a group page, then the MTC device is a first MTC device (870) and if it is not a group page, then the MTC device acts as a first MTC device (872). In either case, the first or acting first MTC device may then obtain radio resources (874) and obtain user plane radio resource information (878).

The first or acting first MTC device may then check, via its configuration data or the like, if the M2M operator needs the first or acting first MTC device to register with the M2M operator (880). If registration may be needed, then the first or acting first MTC device may use a URI or URL to perform M2M service registrations. In either case, the first or acting first MTC device may then access the M2M(x) server and upload data using the account based URI or URL (882). The first or acting first MTC device may then go into the sleep cycle (860).

If it is a reporting cycle (864) and the MTC device is a first MTC device (870), then the first MTC device may then obtain radio resources (874) and obtain user plane radio resource information (878). The first MTC device may then check, via its configuration data or the like, if the M2M operator needs the first MTC device to register with the M2M operator (880). If registration may be needed, then the first MTC device may use a URI or URL to perform M2M service registrations. The first MTC device may then access the M2M(x) server and upload data using the account based URI or URL (882). The first MTC device may then go into the sleep cycle (884).

If it is a reporting cycle and the MTC device is a non-first MTC device (888), then the non-first MTC device obtains user plane radio resource information (878). The non-first MTC device may then check, via its configuration data or the like, if the M2M operator needs each non-first MTC device to register with the M2M operator (880). If registration may be needed, then each non-first MTC device may use a URI or URL to perform M2M service registrations. In either case, the non-first MTC device may then access the M2M(x) server and upload data using the account based URI or URL (882). The non-first MTC device may then go into a sleep cycle (884). If the non-first MTC device is the last MTC device, then the non-first but last MTC device may release radio resources and maintain IP addresses and registration with the M2M operator (886). If the non-first MTC device is not the last MTC device, then the non-first MTC device may go into a sleep cycle.

Figure 9A:
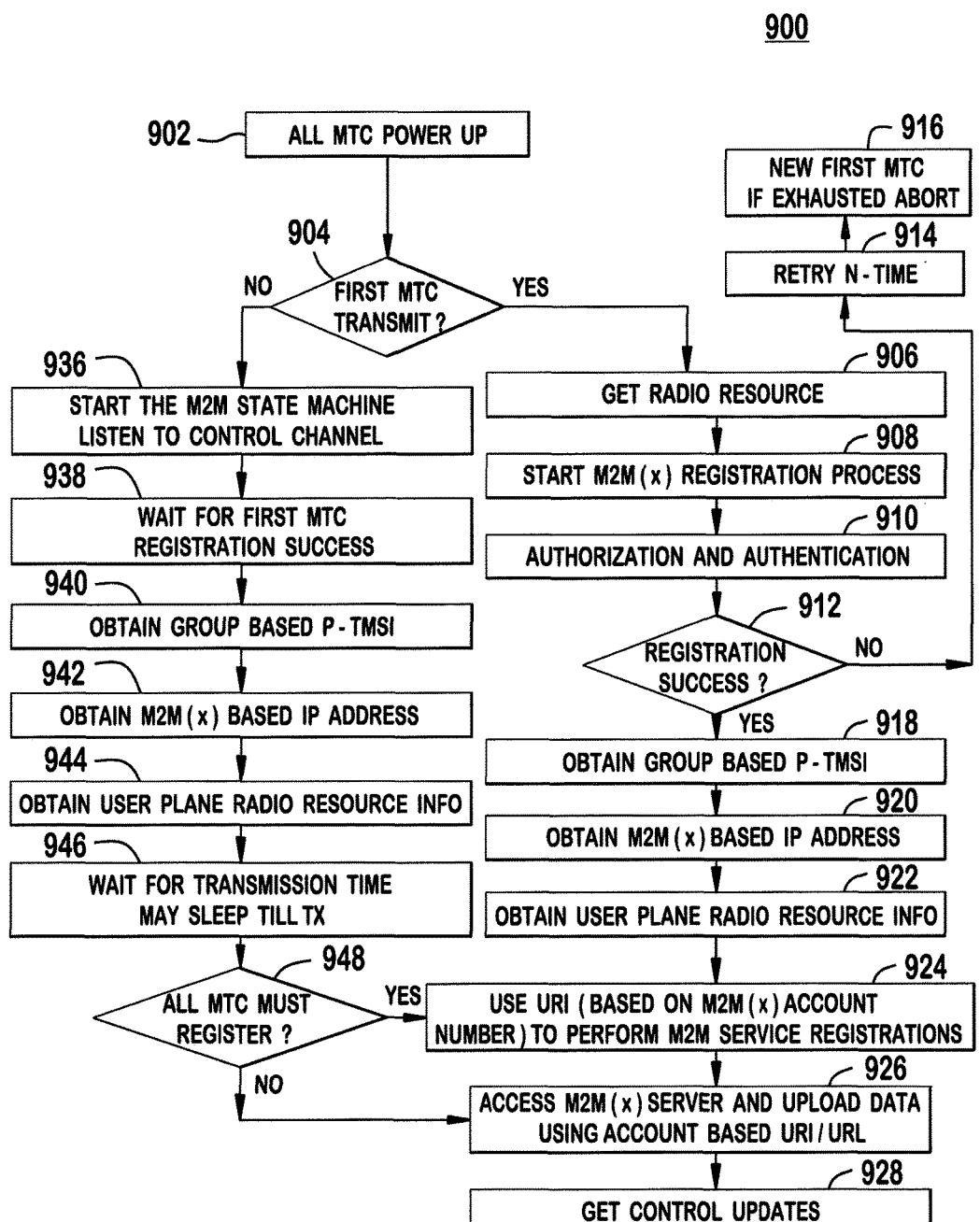
FIGS. 9A and 9B are another example flowchart implementing single registration for MTC including maintaining IP address during a sleep cycle and using multimedia broadcast multicast service (MBMS)
Figure 9B:
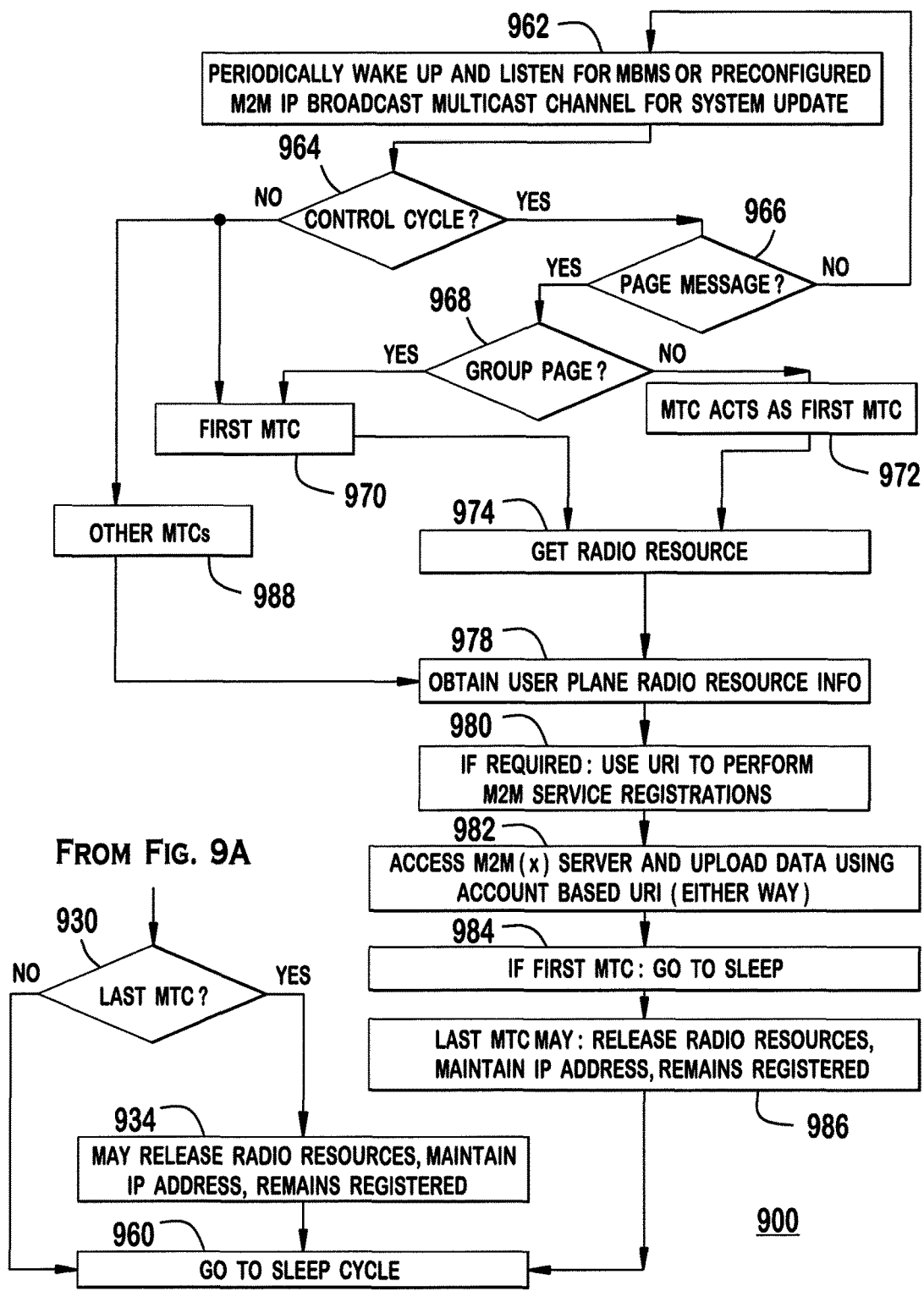

FIGS. 9A and 9B are an example flowchart 900 implementing an example registration process for MTC that maintains the IP connection during sleep cycles and uses multimedia broadcast multicast service (MBMS). Registration may be performed once upon system power up. In this process, a group of MTC devices may belong to the same cell, area or geographic location. The group may use a group based international mobile subscriber identity (IMSI) for 3GPP authorization and authentication and the registration process may be denied if an incorrect IMSI is provided by the MTC devices. Individual MTC devices within the group of MTC devices may use the same radio resources and the same internet protocol (IP) addresses to transmit their data using the same packet-temporary mobile subscriber identity (P-TMSI)/IMSI. An individual uniform resource identifier (URI) may be used as an identifier for identifying MTC devices within a group of MTC devices. The URI may be based on account numbers.

In addition, a first MTC device may perform a registration, for example an IMSI attachment procedure, on behalf of the MTC device group. The first MTC device may be selected either by the network, randomly, hash algorithms, by pre-configurations, or some combination thereof. The first MTC device may receive resources including radio resource controller (RRC) resources, a packet-temporary mobile subscriber identity (P-TMSI), internet protocol (IP) addresses and the like. In case of first MTC device failure, another MTC device may perform the first MTC device activities. Detection of first MTC device failure may be performed by the network or by the MTC devices. A last MTC device may be used to release radio resources and maintain IP addresses and registration with the M2M operator.

The registration process may be applicable once all MTC devices are powered up (902). Once registration has been initiated, the MTC device determines if it is a first MTC device (904). If the MTC device is the first MTC device, then radio resources may be obtained (906) and the M2M(x) registration process may be initiated (908). Authorization and authentication of the first MTC device may then be performed (910).

The first MTC device then determines the success of the M2M(x) registration and/or authorization and authentication processes (912). If the M2M(x) registration process and/or authorization and authentication process are not successful, registration and authentication may be retried for a specified number of times (914). A new first MTC device may be designated after the specified number of retries has been exhausted (916). If the number of retries has been exhausted for the new first MTC device, then the M2M(x) registration and/or authorization and authentication processes may be aborted. Alternatively, if the number of retries for all designated first MTC devices has been exhausted, then the M2M(x) registration and/or authorization and authentication processes may be aborted.

A group based P-TMSI (918), M2M(x) based IP addresses (920), and user plane radio resource information (922) may be obtained if the M2M(x) registration and/or authorization and authentication processes has been successful. The first MTC device may then use a URI or uniform resource locator (URL) to perform M2M service registrations (924). The URI may be based on M2M(x) account numbers. The first MTC device may then access the M2M(x) server and upload data using the account based URI or URL (926). Control information updates are then obtained by the first MTC device (928). The control information may be any type of control information such as configuration data and the like. In this case, since the first MTC device is not the last MTC device (930), the first MTC device goes into a sleep cycle (960).

If the MTC device is not the first MTC device, then the MTC device may initiate the M2M state machine and listen to the control channel (936). Upon successful completion of the first MTC device registration (938), each of the non-first MTC devices may obtain the group based P-TMSI (940), M2M(x) based IP address (942), and user plane radio resource information (944). As stated above, each MTC device within the group of MTC devices may use the same radio resources and the same internet protocol (IP) addresses to transmit their data using the same packet-temporary mobile subscriber identity (P-TMSI)/IMSI. Each non-first MTC device then waits for its designated transmission time (946). The transmission time may be random, pre-configured, polling function, based on a hash function using its identifier and the like. The non-first MTC device may sleep until its designated transmission time.

The non-first MTC device may then check, via its configuration data or the like, if the M2M operator needs each non-first MTC device to register with the M2M server (948). If registration may be needed, then each non-first MTC device may use a URI or URL to perform M2M service registrations (924). The URI may be based on M2M(x) account numbers. The non-first MTC device may then access the M2M(x) server and upload data using the account based URI or URL (926). If registration may not be needed, then each non-first MTC device may then access the M2M (x) server and upload data using the account based URI or URL (926). Each non-first MTC device may then update its control information (928). If the non-first MTC device is not last MTC device (930), the non-first MTC device may go into a sleep cycle (960). If the non-first MTC device is the last MTC device, then the last MTC device may release radio resources and maintain IP addresses and registration with the M2M operator (934). The last MTC device may then go into a sleep cycle (960).

The sleep cycle (960) may then be followed by a periodic wake up cycle (962). The MTC devices wake up during the periodic wake up cycle and may also listen for MBMS or pre-configured M2M IP broadcast or multicast channels for system updates. The wake up cycle may be scheduled by the network, randomly by the MTC devices, pre-configured and combinations thereof. Polling by the network may be done using control channel signaling or using traffic channel in-band signaling. The wake up cycle may have control cycles and reporting cycles. In control cycles where the MTC device groups wakes up, the MTC devices may not have to register again with a 3GPP system control channel and may wait for any updates on the control channel. An IP address may or may not be allocated during the control cycle. Each individual MTC device may be updated using a paging/broadcast message using IMSI/P-TMSI+account numbers. If paged and instructed to connect, an individual MTC device may perform system access requesting RRC connection and IP allocation to connect to the M2M Access Server (M2M AS). The M2M AS may also be referred to as a M2M gateway or MTC gateway. In reporting cycles, control may be performed using the traffic channel signaling on top of IP. Individual MTC devices may be allocated different Local IP addresses within 3GPP for the duration of a reporting cycle.

In particular, each MTC device determines if the wake up cycle is a control cycle or a reporting cycle (964). If it is a control cycle, the MTC device determines if a page message has been sent as discussed above (966). If a page message has not been sent, then the MTC device goes back into the sleep cycle and waits for the next wake up cycle (962). If a page message has been sent, then the MTC device determines if it is a group page (968). If it is a group page, then the MTC device is a first MTC device (970) and if it is not a group page, then the MTC device acts as a first MTC device (972). In either case, the first or acting first MTC device may then obtain radio resources (974) and obtain user plane radio resource information (978).

The first or acting first MTC device may then check, via its configuration data or the like, if the M2M operator needs the first or acting first MTC device to register with the M2M operator (980). If registration may be needed, then the first or acting first MTC device may use a URI or URL to perform M2M service registrations. In either case, the first or acting first MTC device may then access the M2M(x) server and upload data using the account based URI or URL (982). The first or acting first MTC device may then go into the sleep cycle (960).

If it is a reporting cycle (964) and the MTC device is a first MTC device (970), then the first MTC device may then obtain radio resources (974) and obtain user plane radio resource information (978). The first MTC device may then check, via its configuration data or the like, if the M2M operator needs the first MTC device to register with the M2M operator (980). If registration may be needed, then the first MTC device may use a URI or URL to perform M2M service registrations. The first MTC device may then access the M2M(x) server and upload data using the account based URI or URL (982). The first MTC device may then go into the sleep cycle (984).

If it is a reporting cycle and the MTC device is a non-first MTC device (988), then the non-first MTC device obtains user plane radio resource information (978). The non-first MTC device may then check, via its configuration data or the like, if the M2M operator needs each non-first MTC device to register with the M2M operator (980). If registration may be needed, then each non-first MTC device may use a URI or URL to perform M2M service registrations. In either case, the non-first MTC device may then access the M2M(x) server and upload data using the account based URI or URL (982). The non-first MTC device may then go into a sleep cycle (984). If the non-first MTC device is the last MTC device, then the non-first but last MTC device may release radio resources and maintain IP addresses and registration with the M2M operator (986). If the non-first MTC device is not the last MTC device, then the non-first MTC device may go into a sleep cycle.

Figure 10:
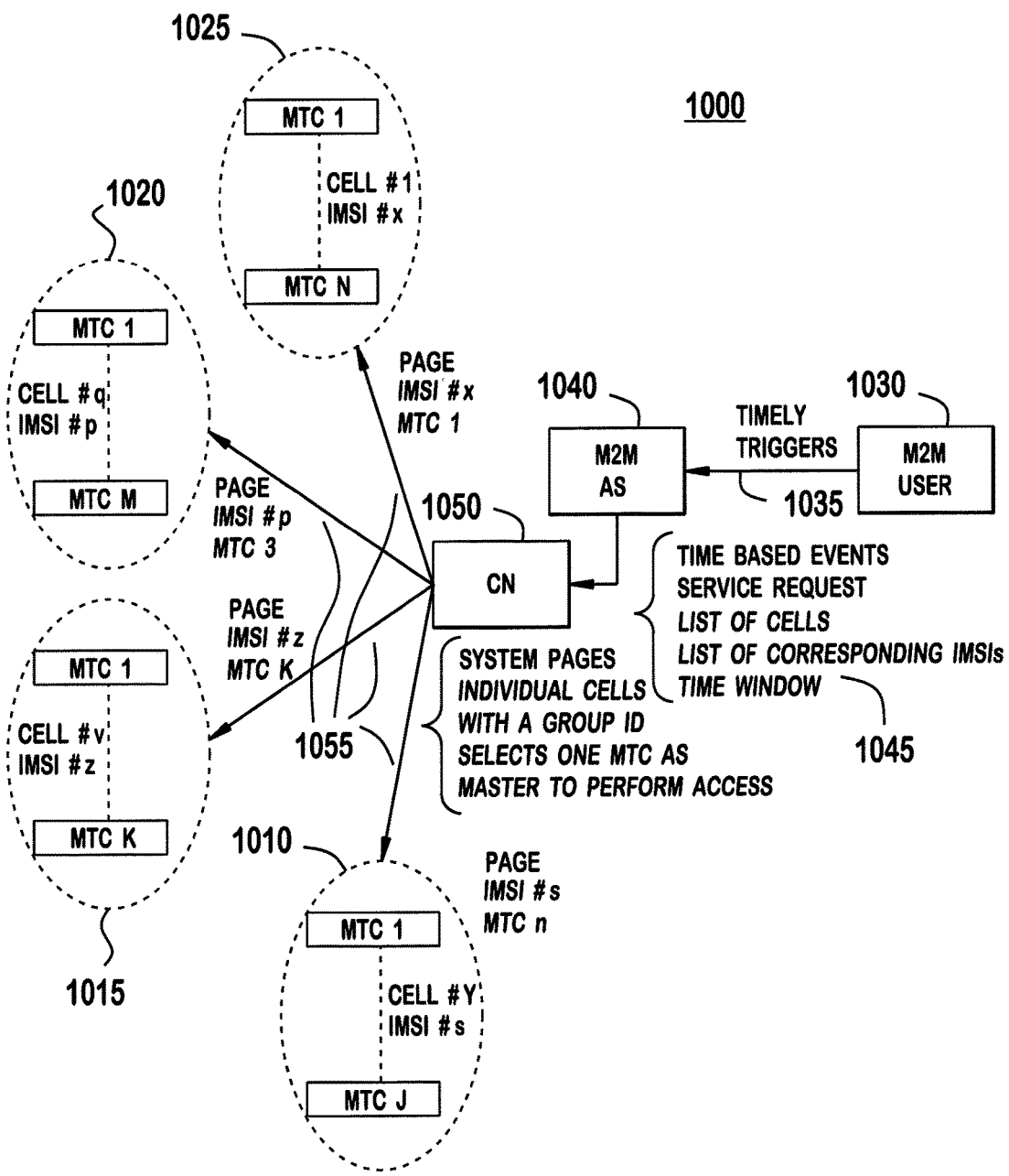
FIG. 10 is an example reporting cycle for a group of MTC WTRUs.

FIG. 10 is an example reporting cycle 1000 for a group of MTC devices. In the reporting cycle, the MTC devices may transmit their data to the network. They may do this in a sequential order specified by the network, or multiple MTC devices may randomly access the system to report their data.

For illustration purposes, four MTC device groups are shown and may be denoted as MTC device group 1010, MTC device group 1015, MTC device group 1020 and MTC device group 1025. Each MTC device group may include multiple MTC devices. For example, MTC device group 1010 may include MTC devices 1-J, MTC device group 1015 may include MTC devices 1-K, MTC device group 1020 may include MTC devices 1-M, and MTC device group 1025 may include MTC devices 1-N. Each MTC device group may be associated with a cell identifier and a IMSI number. For example, MTC device group 1010 may be associated with cell# Y and IMSI# s, MTC device group 1015 may be associated with cell# v and IMSI# z, MTC device group 1020 may be associated with cell# q and IMSI# p, and MTC device group 1025 may be associated with cell#1 and IMSI# x. FIG. 10 also shows a M2M user 1030 that may be in communication with a M2M AS 1040, which in turn may be in communication with a core network 1050. MTC device groups 1010, 1015, 1020 and 1025 may be in communication with CN 1050.

Operationally, the M2M user 1030 may send a request to the M2M AS 1040 for information from certain of the MTC devices (1035). The request may be a periodic trigger, event based trigger, other like triggers or a combination thereof. In response to the M2M user 1030, the M2M AS 1040 may send a service request or trigger a time based event to the CN 1050 (1045). The service request or trigger may include the list of cells or cell identifiers, the list of IMSIs, and a time window. For example, the time window may be the time when the group wakes up and the transmission time is the time allocated to individual MTC for transmission after which it goes to sleep. The CN 1030 may then send a system page to individual cells with a group identifier such as the IMSI # and may also include information to indicate which MTC device may be the master MTC device. As discussed herein, the master MTC device may perform the IMSI attachment process on behalf of the MTC device group. The master MTC device may receive resources including radio resource controller (RRC) resources, a packet-temporary mobile subscriber identity (P-TMSI), internet protocol (IP) addresses and the like.

Figure 11:
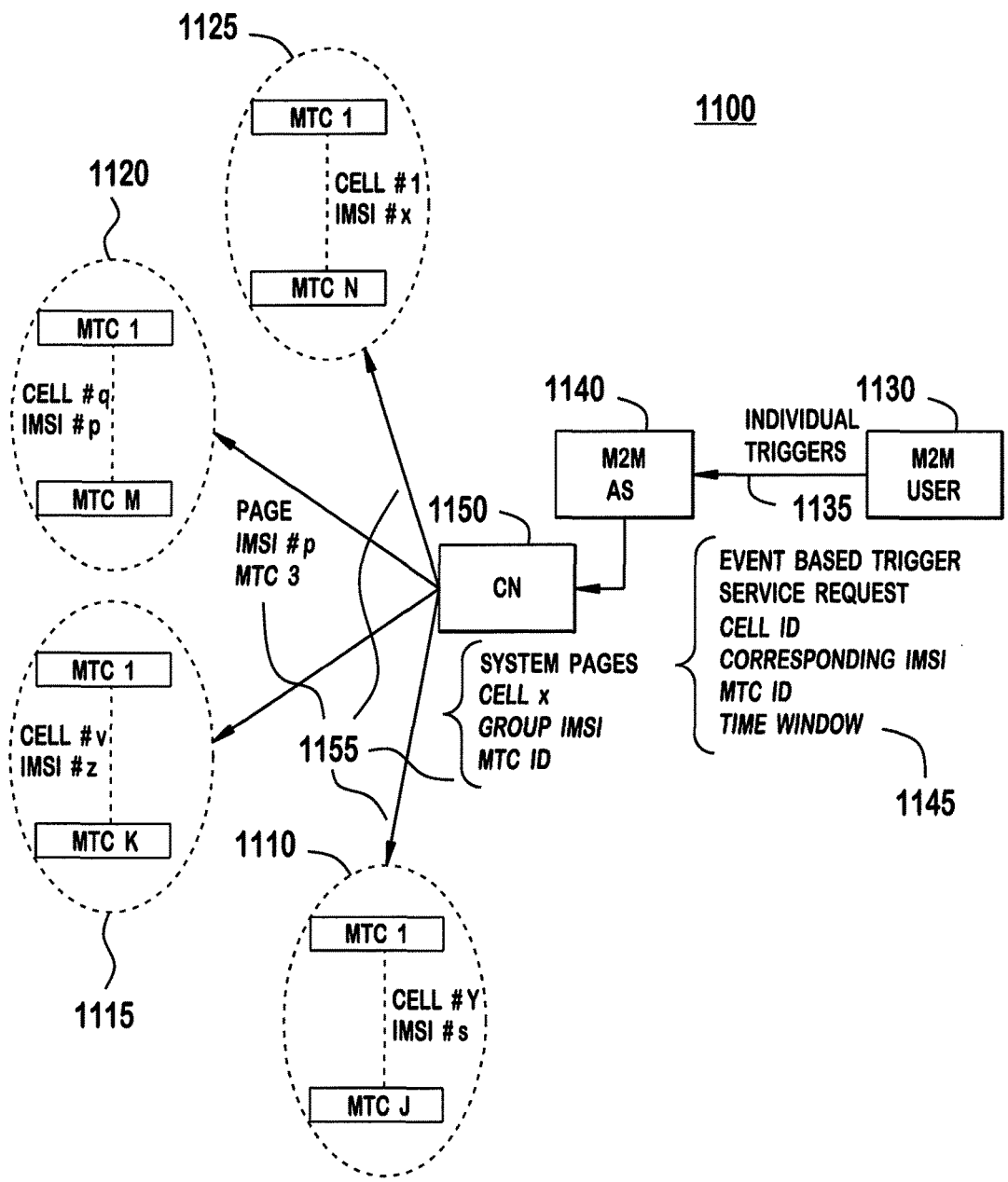
FIG. 11 is an example of control period events for a group of MTC WTRUs.

FIG. 11 is an example of control period events or a control cycle for a group of MTC devices. During the control cycle, the network may send control data to the MTC devices to configure how they operate.

For illustration purposes, four MTC device groups are shown and may be denoted as MTC device group 1110, MTC device group 1115, MTC device group 1120 and MTC device group 1125. Each MTC device group may include multiple MTC devices. For example, MTC device group 1110 may include MTC devices 1-J, MTC device group 1115 may include MTC devices 1-K, MTC device group 1120 may include MTC devices 1-M, and MTC device group 1125 may include MTC devices 1-N. Each MTC device group may be associated with a cell identifier and a IMSI number. For example, MTC device group 1110 may be associated with cell# Y and IMSI# s, MTC device group 1115 may be associated with cell# v and IMSI# z, MTC device group 1120 may be associated with cell# q and IMSI# p, and MTC device group 1125 may be associated with cell#1 and IMSI# x. FIG. 11 also shows a M2M user 1130 that may be in communication with a M2M AS 1140, which in turn may be in communication with a core network 1150. MTC device groups 1110, 1115, 1120 and 1125 may be in communication with CN 1150.

Operationally, the M2M user 1130 may send a request to the M2M AS 1140 to trigger control information updates (1135). The request may be a periodic trigger, event based trigger, other like triggers or a combination thereof. In response to the M2M user 1130, the M2M AS 1140 may send a service request or trigger a time based event to the CN 1150 (1145). The service request or trigger may include the list of cells or cell identifiers, the list of IMSIs, MTC device identifiers and a time window. The CN 1130 may then send a system page with a cell identifier, a group identifier such as the IMSI # and may also include the MTC device identifier.

Figure 12A:
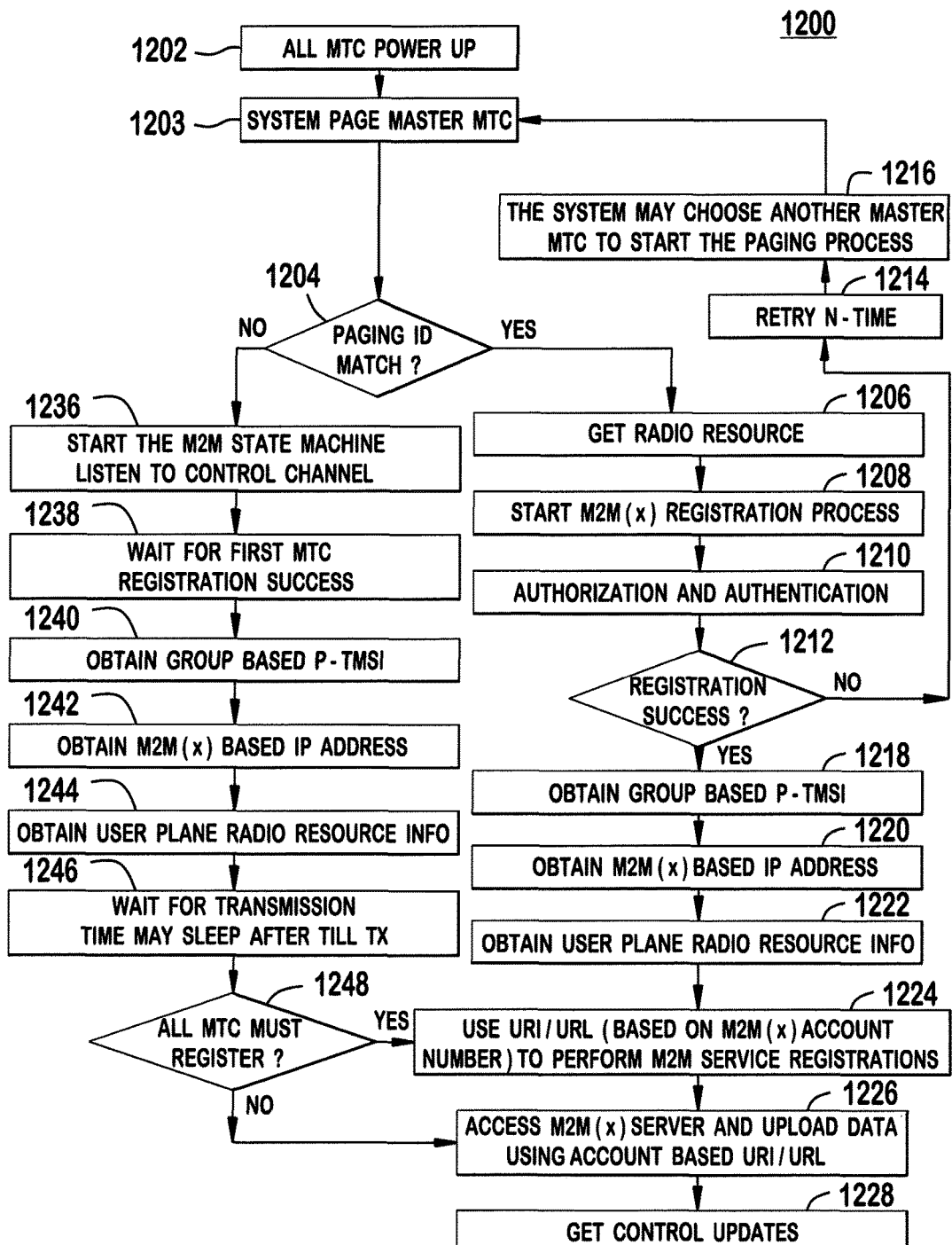
FIGS. 12A and 12B are an example flowchart implementing network based registration for MTC including releasing IP connections during sleep cycles.
Figure 12B:
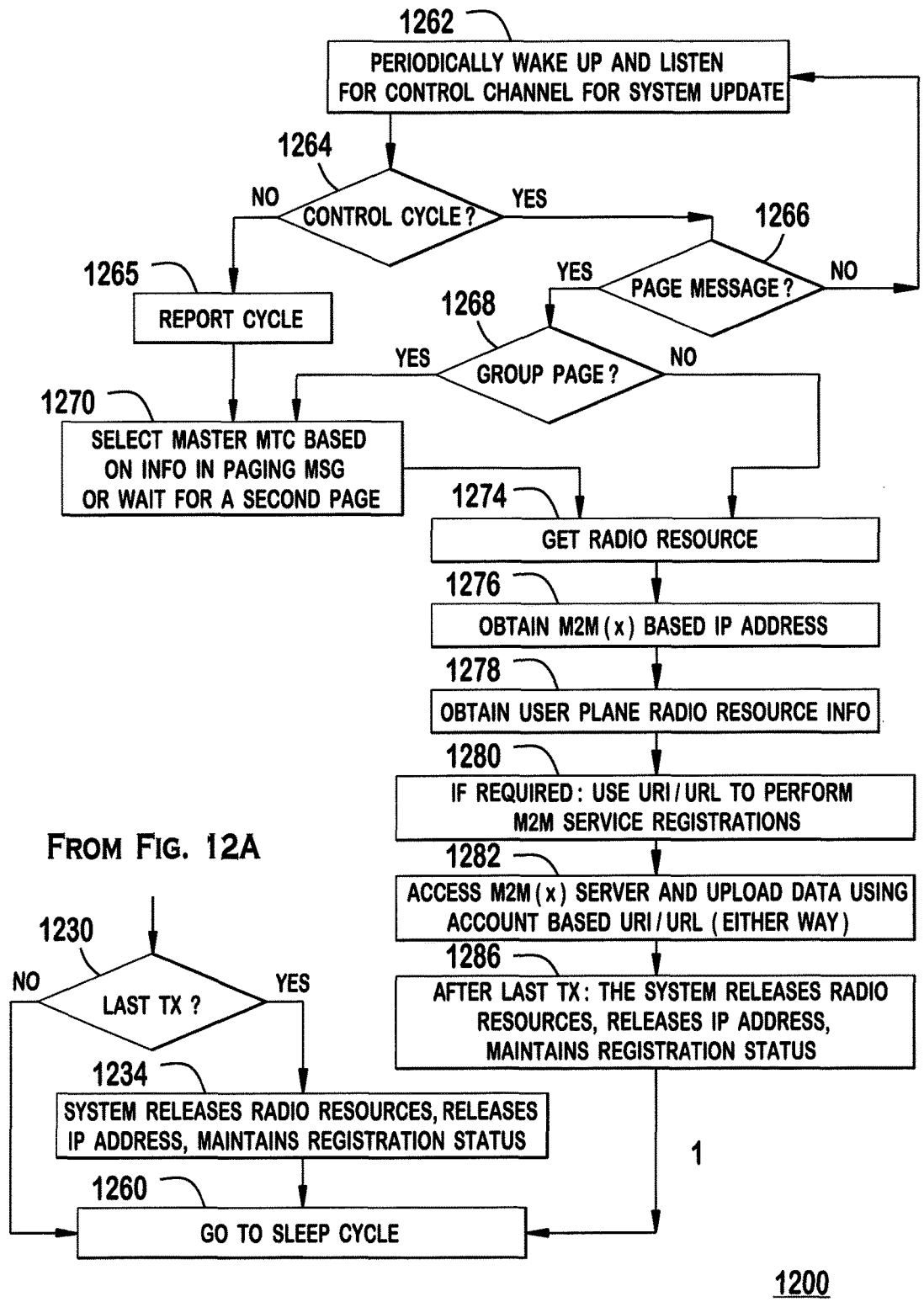

FIGS. 12A and 12B are an example flowchart 1200 implementing network based registration for MTC including releasing IP connections during sleep cycles. Registration may be performed once upon system power up. In this process, a group of MTC devices may belong to the same cell, area or geographic location. The group may use a group based international mobile subscriber identity (IMSI) for 3GPP authorization and authentication and the registration process may be denied if an incorrect IMSI is provided by the MTC devices. Individual MTC devices within the group of MTC devices may use the same radio resources and the same internet protocol (IP) addresses to transmit their data using the same packet-temporary mobile subscriber identity (P-TMSI)/IMSI. An individual uniform resource identifier (URI) may be used as an identifier for identifying MTC devices within a group of MTC devices. The URI may be based on account numbers.

In addition, one MTC device may perform a registration, for example an IMSI attachment procedure on behalf of the MTC device group. This MTC device may be referred to as a master MTC device. The master MTC device may be selected by the network. The master MTC device may receive resources including radio resource controller (RRC) resources, a packet-temporary mobile subscriber identity (P-TMSI), internet protocol (IP) addresses and the like. In case of a master MTC device failure, another MTC device may perform the master MTC device activities. Detection of a master MTC device failure may be performed by the network, by the master MTC device itself and/or other MTC devices in or outside the group.

The registration process is applicable once all MTC devices are powered up (1202). The network may send a system page that includes the identification of the master MTC device (1203). Once registration has been initiated, the MTC device determines if it is the master MTC device (1204). If the MTC device is the master MTC device, then radio resources may be obtained (1206) and the M2M(x) registration process may be initiated (1208). Authorization and authentication of the master MTC device may then be performed (1210).

The master MTC device then determines the success of the M2M(x) registration and/or authorization and authentication processes (1212). If the M2M(x) registration process and/or authorization and authentication process are not successful, registration and authentication may be retried for a specified number of times (1214). The network may select another master MTC device by sending another system page with the new master MTC device (1216).

A group based P-TMSI (1218), M2M(x) based IP addresses (1220), and user plane radio resource information (1222) may be obtained if the M2M(x) registration and/or authorization and authentication processes has been successful. The master MTC device may then use a URI or URL to perform M2M service registrations (1224). The URI may be based on M2M(x) account numbers. The master MTC device may then access the M2M(x) server and upload data using the account based URI or URL (1226). Control information updates are then obtained by the master MTC device (1228). The control information may be any type of control information such as configuration data and the like.

In the event that the master MTC device is the last MTC device of the group to transmit its information to the M2M(x) server (1230), then the master MTC device may release radio resources and IP addresses but maintains its registration status with the M2M operator (1234). The master MTC device then goes into a sleep cycle (1260). In the event that the master MTC device is not the last MTC device, then the master MTC device may enter the sleep cycle (1260).

If the MTC device is not the master MTC device, then the MTC device may initiate the M2M state machine and listen to the control channel (1236). Upon successful completion of the master MTC device registration (638), each MTC device may obtain the group based P-TMSI (1240), M2M(x) based IP address (1242), and user plane radio resource information (1244). As stated above, each MTC device within the group of MTC devices may use the same radio resources and the same internet protocol (IP) addresses to transmit their data using the same packet-temporary mobile subscriber identity (P-TMSI)/IMSI. Each MTC device then waits for its designated transmission time (1246). The transmission time may be random, pre-configured, polling function, based on a hash function using its identifier and the like. The MTC device may sleep until its transmission time.

The MTC device may then check, via its configuration data or the like, if the M2M operator needs each MTC device to register with the M2M server (1248). If registration may be needed, then each MTC device may use a URI or URL to perform M2M service registrations (1224). The URI may be based on M2M(x) account numbers. The MTC device may then access the M2M(x) server and upload data using the account based URI or URL (1226). If registration may not be needed, then each non-alpha MTC device may then access the M2M(x) server and upload data using the account based URI or URL (1226). Each MTC device may then update its control information (1228).

In the event that the MTC device is the last MTC device of the group to transmit its information to the M2M(x) server (1230), then the MTC device may release radio resources and IP addresses but maintains its registration status with the M2M operator (1234). The MTC device then goes into a sleep cycle (1260). In the event that the MTC device is not the last MTC device, then the MTC device may enter the sleep cycle (1260).

The sleep cycle (1260) may then be followed by a periodic wake up cycle (1262). The MTC devices wake up during the periodic wake up cycle and may also listen to a control channel for system updates. The wake up cycle may be scheduled by the network, randomly by the MTC devices, pre-configured and combinations thereof. Polling by the network may be done using control channel signaling or using traffic channel in-band signaling. The wake up cycle may have control cycles and reporting cycles. In control cycles where the MTC device groups wakes up, the MTC devices may not have to register again with a 3GPP system control channel and may wait for any updates on the control channel. An IP address may or may not be allocated during the control cycle. Each individual MTC device may be updated using a paging/broadcast message using IMSI/P-TMSI+account numbers. If paged and instructed to connect, an individual MTC device may perform system access requesting RRC connection and IP allocation to connect to the M2M Access Server (M2M AS). In reporting cycles, control may be performed using the traffic channel signaling on top of IP. Individual MTC devices may be allocated different Local IP addresses within 3GPP for the duration of a reporting cycle.

In particular, each MTC device determines if the wake up cycle is a control cycle or a reporting cycle (1264). If it is a control cycle, the MTC device determines if a page message has been sent as discussed above (1266). If a page message has not been sent, then the MTC device goes back into the sleep cycle and waits for the next wake up cycle (1262). If a page message has been sent, then the MTC device determines if it is a group page (1268). If it is a group page, then a master MTC device may be selected/identified based on information in paging message or the MTC device may wait for a second page (1270). If it is not a group page or a master MTC device has been selected, then the MTC device (which may be a master MTC device) may then obtain radio resources (1274), M2M(x) based IP address (1276), and obtain user plane radio resource information (1278).

The MTC device may then check, via its configuration data or the like, if the M2M operator needs the MTC device to register with the M2M operator (1280). If registration may be needed, then the MTC device may use a URI or URL to perform M2M service registrations. In either case, the MTC device may then access the M2M(x) server and upload data using the account based URI or URL (1282). If the MTC device may be the last MTC device, then the MTC device may release radio resources and IP addresses but maintains registration with the M2M operator (1286). The MTC device may then enter the sleep cycle (1260). If the MTC device is not the last MTC device, then the MTC device may enter the sleep cycle (1260).

If it is a reporting cycle (1265), then a master MTC device may be selected/identified based on information in paging message or the MTC device may wait for a second page (1270). The MTC device (which may be a master MTC device) may then obtain radio resources (1274), M2M(x) based IP address (1276), and obtain user plane radio resource information (1278).

The MTC device may then check, via its configuration data or the like, if the M2M operator needs the MTC device to register with the M2M operator (1280). If registration may be needed, then the MTC device may use a URI or URL to perform M2M service registrations. In either case, the MTC device may then access the M2M(x) server and upload data using the account based URI or URL (1282). If the MTC device may be the last MTC device, then the MTC device may release radio resources and IP addresses but maintains registration with the M2M operator (1286). The MTC device may then enter the sleep cycle (1260). If the MTC device is not the last MTC device, then the MTC device may enter the sleep cycle (1260).

Figure 13A:
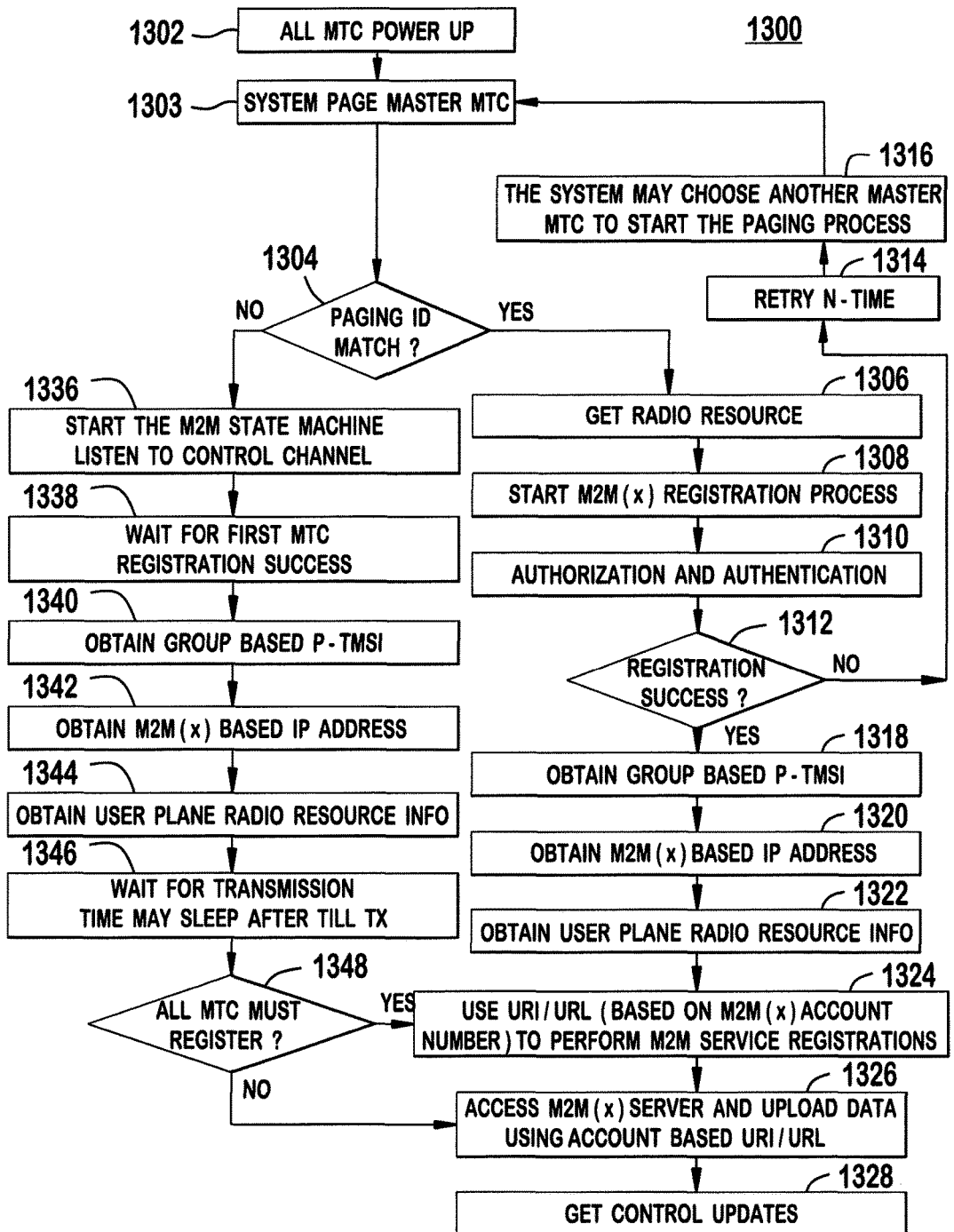
FIGS. 13A and 13B are an example flowchart implementing network based registration for MTC including maintaining IP connections during sleep cycles.
Figure 13B:
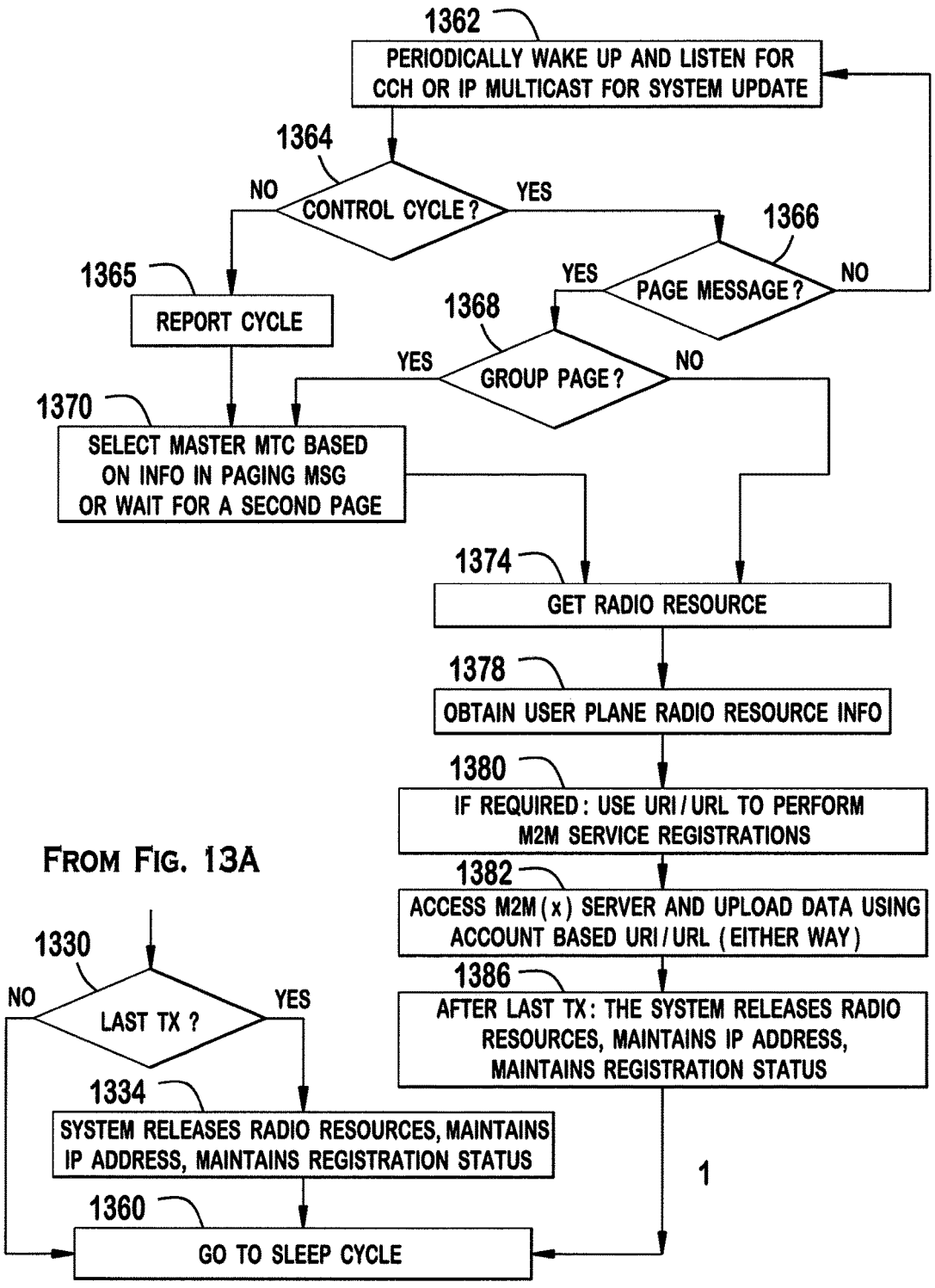

FIGS. 13A and 13B are an example flowchart 1300 implementing network based registration for MTC including maintaining IP connections during sleep cycles. Registration may be performed once upon system power up. In this process, a group of MTC devices may belong to the same cell, area or geographic location. The group may use a group based international mobile subscriber identity (IMSI) for 3GPP authorization and authentication and the registration process may be denied if an incorrect IMSI is provided by the MTC devices. Individual MTC devices within the group of MTC devices may use the same radio resources and the same internet protocol (IP) addresses to transmit their data using the same packet-temporary mobile subscriber identity (P-TMSI)/IMSI. An individual uniform resource identifier (URI) may be used as an identifier for identifying MTC devices within a group of MTC devices. The URI may be based on account numbers.

In addition, one MTC device may perform a registration, for example an IMSI attachment procedure, on behalf of the MTC device group. This MTC device may be referred to as a master MTC device. The master MTC device may be selected by the network. The master MTC device may receive resources including radio resource controller (RRC) resources, a packet-temporary mobile subscriber identity (P-TMSI), internet protocol (IP) addresses and the like. In case of a master MTC device failure, another MTC device may perform the master MTC device activities. Detection of a master MTC device failure may be performed by the network, by the master MTC device itself and/or other MTC devices in or outside the group.

The registration process is applicable once all MTC devices are powered up (1302). The network may send a system page that includes the identification of the master MTC device (1303). Once registration has been initiated, the MTC device determines if it is the master MTC device (1304). If the MTC device is the master MTC device, then radio resources may be obtained (1306) and the M2M(x) registration process may be initiated (1308). Authorization and authentication of the master MTC device may then be performed (1310).

The master MTC device then determines the success of the M2M(x) registration and/or authorization and authentication processes (1312). If the M2M(x) registration process and/or authorization and authentication process are not successful, registration and authentication may be retried for a specified number of times (1314). The network may select another master MTC device by sending another system page with the new master MTC device (1316).

A group based P-TMSI (1318), M2M(x) based IP addresses (1320), and user plane radio resource information (1322) may be obtained if the M2M(x) registration and/or authorization and authentication processes has been successful. The master MTC device may then use a URI or URL to perform M2M service registrations (1324). The URI may be based on M2M(x) account numbers. The master MTC device may then access the M2M(x) server and upload data using the account based URI or URL (1326). Control information updates are then obtained by the master MTC device (1328). The control information may be any type of control information such as configuration data and the like.

In the event that the master MTC device is the last MTC device of the group to transmit its information to the M2M(x) server (1330), then the master MTC device may release radio resources but maintains IP addresses and its registration status with the M2M operator (1334). The master MTC device then goes into a sleep cycle (1360). In the event that the master MTC device is not the last MTC device, then the master MTC device may enter the sleep cycle (1360).

If the MTC device is not the master MTC device, then the MTC device may initiate the M2M state machine and listen to the control channel (1336). Upon successful completion of the master MTC device registration (1338), each MTC device may obtain the group based P-TMSI (1340), M2M(x) based IP address (1342), and user plane radio resource information (1344). As stated above, each MTC device within the group of MTC devices may use the same radio resources and the same internet protocol (IP) addresses to transmit their data using the same packet-temporary mobile subscriber identity (P-TMSI)/IMSI. Each MTC device then waits for its designated transmission time (1346). The transmission time may be random, pre-configured, polling function, based on a hash function using its identifier and the like. The MTC device may sleep until its transmission time.

The MTC device may then check, via its configuration data or the like, if the M2M operator needs each MTC device to register with the M2M server (1348). If registration may be needed, then each MTC device may use a URI or URL to perform M2M service registrations (1324). The URI may be based on M2M(x) account numbers. The MTC device may then access the M2M(x) server and upload data using the account based URI or URL (1326). If registration may not be needed, then each non-alpha MTC device may then access the M2M(x) server and upload data using the account based URI or URL (1326). Each MTC device may then update its control information (1328).

In the event that the MTC device is the last MTC device of the group to transmit its information to the M2M(x) server (1330), then the MTC device may release radio resources but maintains IP addresses and its registration status with the M2M operator (1334). The MTC device then goes into a sleep cycle (1360). In the event that the MTC device is not the last MTC device, then the MTC device may enter the sleep cycle (1360).

The sleep cycle (1360) may then be followed by a periodic wake up cycle (1362). The MTC devices wake up during the periodic wake up cycle and may also listen to a control channel or IP multicast for system updates. The wake up cycle may be scheduled by the network, randomly by the MTC devices, pre-configured and combinations thereof. Polling by the network may be done using control channel signaling or using traffic channel in-band signaling. The wake up cycle may have control cycles and reporting cycles. In control cycles where the MTC device groups wakes up, the MTC devices may not have to register again with a 3GPP system control channel and may wait for any updates on the control channel. An IP address may or may not be allocated during the control cycle. Each individual MTC device may be updated using a paging/broadcast message using IMSI/P-TMSI+account numbers. If paged and instructed to connect, an individual MTC device may perform system access requesting RRC connection and IP allocation to connect to the M2M Access Server (M2M AS). In reporting cycles, control may be performed using the traffic channel signaling on top of IP. Individual MTC devices may be allocated different Local IP addresses within 3GPP for the duration of a reporting cycle.

In particular, each MTC device determines if the wake up cycle is a control cycle or a reporting cycle (1364). If it is a control cycle, the MTC device determines if a page message has been sent as discussed above (1366). If a page message has not been sent, then the MTC device goes back into the sleep cycle and waits for the next wake up cycle (1362). If a page message has been sent, then the MTC device determines if it is a group page (1368). If it is a group page, then a master MTC device may be selected/identified based on information in paging message or the MTC device may wait for a second page (1370). If it is not a group page or a master MTC device has been selected, then the MTC device (which may be a master MTC device) may then obtain radio resources (1374) and user plane radio resource information (1378).

The MTC device may then check, via its configuration data or the like, if the M2M operator needs the MTC device to register with the M2M operator (1380). If registration may be needed, then the MTC device may use a URI or URL to perform M2M service registrations. In either case, the MTC device may then access the M2M(x) server and upload data using the account based URI or URL (1382). If the MTC device may be the last MTC device, then the MTC device may release radio resources but maintains IP addresses and its registration with the M2M operator (1386). The MTC device may then enter the sleep cycle (1360). If the MTC device is not the last MTC device, then the MTC device may enter the sleep cycle (1360).

If it is a reporting cycle (1365), then a master MTC device may be selected/identified based on information in paging message or the MTC device may wait for a second page (1370). The MTC device (which may be a master MTC device) may then obtain radio resources (1374) and obtain user plane radio resource information (1378).

The MTC device may then check, via its configuration data or the like, if the M2M operator needs the MTC device to register with the M2M operator (1380). If registration may be needed, then the MTC device may use a URI or URL to perform M2M service registrations. In either case, the MTC device may then access the M2M(x) server and upload data using the account based URI or URL (1382). If the MTC device may be the last MTC device, then the MTC device may release radio resources but maintain IP addresses and its registration with the M2M operator (1386). The MTC device may then enter the sleep cycle (1360). If the MTC device is not the last MTC device, then the MTC device may enter the sleep cycle (1360).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU) which is configured for machine type communication (MTC), comprising:
    determining that the WTRU has a unique designation with respect to other members of the an MTC group, wherein only one WTRU from an MTC group has the unique designation, wherein the WTRU with the unique designation is allowed to act on behalf of other members of the group, wherein the determination that the WTRU has a unique designation is based on an event;
    receiving a paging message;
    determining that the paging message is a group paging message;
    performing registration with a MTC server for all members of the MTC group in response to the paging message being a group paging message;
    receiving connectivity information;
    performing MTC service registration;
    transmitting data to the MTC server;
    receiving a control information update;
    waiting for a last WTRU of the MTC group to transmit information;
    entering a sleep cycle after the last MTC device transmits information; and
    entering a wake up cycle and listening for system updates.

2. The method of claim 1, wherein performing registration with the MTC server is an international mobile subscriber identity (IMSI) attachment procedure.

3. The method of claim 1, wherein all members of the MTC group use the same radio resources.

4. The method of claim 1 wherein the connectivity information includes at least one of a group based packet-temporary mobile subscriber identity (P-TMSI), an MTC based Internet Protocol (IP) address, and/or radio resource information.

5. The method of claim 1, wherein the performing MTC service registration is performed using one of a uniform resource identity (URI) or a uniform resource locator (URL) and wherein the method further comprises accessing the MTC server based on the URI or URL.

6. The method of claim 1, further comprising:
    upon the WTRU being the last WTRU, performing one of:
        releasing radio resources and internet protocol (IP) addresses and maintaining registration; or
        releasing radio resources and maintaining IP addresses and registration.

7. The method of claim 1, wherein the wake up cycle is one of a control cycle or a reporting cycle.

8. The method of claim 1 wherein the listening for system updates includes listening for multimedia broadcast multicast service (MBMS) information.

9. A wireless transmit/receive unit (WTRU) for machine type communication (MTC), comprising:
    a transmitter;
    a receiver;
    a processor in communication with the receiver and transmitter;
    the processor configured to determine that the WTRU has a unique designation with respect to other members of an MTC group, wherein only one WTRU from the MTC group has the unique designation, wherein the WTRU with the unique designation is allowed to act on behalf of other members of the group, wherein the determination that the WTRU has a unique designation is based on an event;
    the receiver configured to receive a paging message;
    the processor configured to determine that the paging message is a group paging message;
    the processor configured to perform registration with a MTC server for all members of the MTC group in response to the paging message being a group paging message;
    the receiver configured to receive connectivity information;
    the processor configured to perform MTC service registration;
    the transmitter configured to transmit data to the MTC server;
    the receiver configured to receive a control information update;
    the processor configured to wait for a last WTRU of the MTC group to transmit information;
    the processor configured to enter a sleep cycle after the last WTRU of the MTC group transmits information; and
    the processor configured to enter a wake up cycle and listen for system updates.

10. The WTRU of claim 9, wherein registration with the MTC server is an international mobile subscriber identity (IMSI) attachment procedure.

11. The WTRU of claim 9, wherein all members of the MTC group use the same radio resources.

12. The WTRU of claim 9 wherein the connectivity information includes at least one of a group based packet-temporary mobile subscriber identity (P-TMSI), an MTC based Internet Protocol (IP) address, and/or radio resource information.

13. The WTRU of claim 9, wherein the MTC service registration is performed using one of a uniform resource identity (URI) or a uniform resource locator (URL) and wherein the processor, transmitter, and receiver are configured to access the MTC server based on the URI or URL.

14. The WTRU of claim 9, further comprising:
upon the WTRU being the last WTRU, the processor is configured to:
release radio resources and internet protocol (IP) addresses and maintain registration; or
release radio resources and maintain IP addresses and registration.

15. The WTRU of claim 9, wherein the wake up cycle is one of a control cycle or a reporting cycle.

16. The WTRU of claim 9 wherein the system updates includes multimedia broadcast multicast service (MBMS) information.

\* \* \* \* \*